(12) United States Patent
Jain et al.

(10) Patent No.: US 10,279,567 B2
(45) Date of Patent: May 7, 2019

(54) LIGHT-WEIGHT, HIGH STIFFNESS GLASS LAMINATE STRUCTURE

(71) Applicant: CORNING INCORPORATED, Corning, NY (US)

(72) Inventors: Anurag Jain, Painted Post, NY (US); Michael M. Laurin, Pittsfield, MA (US); Christianus Johannes Jacobus Maas, Zeeland (NL); Michael Aaron McDonald, Painted Post, NY (US); Michael John Moore, Corning, NY (US); Charlie W Wood, Peru, MA (US)

(73) Assignee: CORNING INCORPORATED, Corning, NY (US)

( * ) Notice: Subject to any disclaimer, the term of this patent is extended or adjusted under 35 U.S.C. 154(b) by 674 days.

(21) Appl. No.: 14/471,830

(22) Filed: Aug. 28, 2014

(65) Prior Publication Data

US 2015/0064374 A1    Mar. 5, 2015

Related U.S. Application Data

(60) Provisional application No. 61/871,928, filed on Aug. 30, 2013.

(51) Int. Cl.
  *B32B 17/10* (2006.01)
  *B32B 37/18* (2006.01)
  *E06B 3/66* (2006.01)

(52) U.S. Cl.
  CPC .. *B32B 17/10036* (2013.01); *B32B 17/10018* (2013.01); *B32B 17/1077* (2013.01);
  (Continued)

(58) Field of Classification Search
  CPC ........ B32B 17/10036; B32B 17/10091; B32B 17/10137; B32B 17/10779;
  (Continued)

(56) References Cited

U.S. PATENT DOCUMENTS 3,220,973 A   11/1965   Goldberg
3,622,440 A   11/1971   Snedeker et al.
(Continued)

FOREIGN PATENT DOCUMENTS

CN   201857351 U   6/2011   ............ C03C 27/12
CN   104610871 A   5/2015
(Continued)

OTHER PUBLICATIONS

International Search Report and Written Opinon of the International Searching Authority; PCT/US2013/043512; dated Aug. 14, 2013; 12 Pages.
(Continued)

*Primary Examiner* — Donald J Loney

(57) ABSTRACT

A laminate structure having a first chemically strengthened glass layer, a second chemically strengthened glass layer, and a polymer interlayer structure intermediate the first and second glass layers. The polymer interlayer structure can include a first polymeric layer adjacent to the first glass layer, a second polymeric layer adjacent to the second glass layer, and a polymeric rigid core intermediate the first and second polymeric layers.

13 Claims, 8 Drawing Sheets

(52) U.S. Cl.
CPC .. *B32B 17/10091* (2013.01); *B32B 17/10119* (2013.01); *B32B 17/10137* (2013.01); *B32B 17/10678* (2013.01); *B32B 17/10752* (2013.01); *B32B 17/10761* (2013.01); *B32B 17/10779* (2013.01); *B32B 17/10788* (2013.01); *B32B 17/10798* (2013.01); *B32B 37/18* (2013.01); *E06B 3/66* (2013.01); *B32B 2367/00* (2013.01); *B32B 2369/00* (2013.01); *B32B 2383/00* (2013.01); *Y10T 156/10* (2015.01); *Y10T 428/2495* (2015.01); *Y10T 428/24868* (2015.01); *Y10T 428/24926* (2015.01); *Y10T 428/24967* (2015.01); *Y10T 428/31507* (2015.04); *Y10T 428/31663* (2015.04)

(58) Field of Classification Search
CPC .............. B32B 17/10752; B32B 37/18; B32B 2383/00; B32B 2639/00; B32B 2367/00
See application file for complete search history.

(56) References Cited

U.S. PATENT DOCUMENTS

| | | | |
|---|---|---|---|
| 3,666,614 A * | 5/1972 | Snedeker et al. ....... | B32B 17/10 428/412 |
| 3,801,423 A * | 4/1974 | Van Laethem ... | B32B 17/10018 428/155 |
| 4,204,026 A * | 5/1980 | Le Grand ............... | B32B 17/10 428/409 |
| 4,243,719 A | 1/1981 | Holmes .......... | 428/411 |
| 4,483,700 A | 11/1984 | Forker, Jr. et al. | |
| 4,668,574 A | 5/1987 | Bolton et al. ................. | 428/339 |
| 4,985,099 A | 1/1991 | Mertens et al. | |
| 5,262,232 A | 11/1993 | Wilfong et al. | |
| 5,456,372 A * | 10/1995 | Solinov ............. | B32B 17/10018 216/34 |
| 5,589,272 A * | 12/1996 | Braun ..................... | B32B 17/10 428/412 |
| 5,670,006 A | 9/1997 | Wilfong et al. | |
| 5,674,790 A | 10/1997 | Araujo | |
| 5,696,179 A | 12/1997 | Chawla | |
| 5,744,557 A | 4/1998 | McCormick et al. | |
| 5,856,022 A | 1/1999 | McCormick et al. | |
| 5,863,664 A | 1/1999 | McCormick et al. | |
| 6,069,214 A | 5/2000 | McCormick et al. | |
| 6,069,219 A | 5/2000 | McCormick et al. | |
| 6,132,882 A * | 10/2000 | Landin ............. | B32B 17/10036 428/437 |
| 6,251,493 B1 | 6/2001 | Johnson et al. | |
| 6,265,054 B1 | 7/2001 | Bravet et al. .................. | 428/213 |
| 6,298,189 B1 | 10/2001 | Szum et al. | |
| 6,432,522 B1 | 8/2002 | Friedman et al. ............ | 428/212 |
| 6,821,629 B2 | 11/2004 | Garnier et al. | |
| 6,849,333 B2 | 2/2005 | Schissel et al. | |
| 7,018,700 B2 | 3/2006 | Park | |
| 7,121,380 B2 | 10/2006 | Garnier et al. | |
| 7,189,457 B2 | 3/2007 | Anderson | |
| 7,226,955 B2 | 6/2007 | Subramonian et al. | |
| 7,276,543 B2 | 10/2007 | Bishop et al. | |
| 7,666,511 B2 | 2/2010 | Ellison et al. | |
| 7,754,338 B2 | 7/2010 | Anderson | |
| 7,764,855 B2 | 7/2010 | Roba et al. | |
| 7,799,840 B2 | 9/2010 | Wheeler et al. | |
| 7,829,192 B2 | 11/2010 | Boure et al. | |
| 7,892,629 B2 | 2/2011 | Rehfeld et al. | |
| 7,973,106 B2 | 7/2011 | Fisk et al. | |
| 8,092,919 B2 | 1/2012 | Lee et al. | |
| 8,101,267 B2 | 1/2012 | Samuels et al. | |
| 8,242,185 B2 | 8/2012 | Smith et al. | |
| 8,313,838 B2 | 11/2012 | Steuer et al. | |
| 8,328,273 B2 | 12/2012 | Baroggi et al. | |
| 8,541,504 B2 | 9/2013 | Kusanose et al. | |
| 8,632,887 B2 | 1/2014 | Iwamoto et al. | |
| 8,686,060 B2 | 4/2014 | Smith et al. | |
| 8,691,911 B2 | 4/2014 | Doshi et al. | |
| 8,835,750 B2 | 9/2014 | Lenges | |
| 8,889,254 B2 | 11/2014 | Bayne et al. | |
| 8,986,072 B2 | 3/2015 | Darcangelo et al. | |
| 9,102,122 B2 | 8/2015 | Rehfeld et al. | |
| 9,248,599 B2 | 2/2016 | Chen et al. | |
| 2001/0044023 A1 | 11/2001 | Johnson et al. | |
| 2001/0046595 A1 | 11/2001 | Moran et al. | |
| 2003/0203167 A1 | 10/2003 | Bell et al. | |
| 2006/0165929 A1 | 7/2006 | Lenges et al. | |
| 2007/0014976 A1 | 1/2007 | Matsudo | |
| 2007/0154694 A1 | 7/2007 | Samuels et al. | |
| 2007/0224427 A1 | 9/2007 | Kunita et al. | |
| 2008/0207829 A1 | 8/2008 | Hofmann et al. | |
| 2008/0248315 A1 | 10/2008 | Wiand | |
| 2008/0254302 A1 | 10/2008 | Bourcier et al. | |
| 2008/0272513 A1 | 11/2008 | Stenzel | |
| 2009/0311497 A1 | 12/2009 | Aoki | |
| 2010/0119846 A1 * | 5/2010 | Sawada ................. | C03B 33/023 428/426 |
| 2011/0135269 A1 | 6/2011 | Kim et al. | |
| 2011/0165393 A1 * | 7/2011 | Bayne ..................... | C03C 15/02 428/215 |
| 2012/0094084 A1 | 4/2012 | Fisher et al. | |
| 2012/0094100 A1 | 4/2012 | Takagi et al. .................. | 428/215 |
| 2012/0135226 A1 * | 5/2012 | Bookbinder ............ | C03C 3/062 428/335 |
| 2012/0240626 A1 * | 9/2012 | Matsumoto ........... | C03C 21/002 65/30.14 |
| 2012/0328843 A1 | 12/2012 | Cleary et al. | |
| 2013/0079474 A1 * | 3/2013 | Ramalingam ........... | C08L 79/08 525/423 |
| 2013/0086948 A1 | 4/2013 | Bisson et al. | |
| 2013/0125589 A1 | 5/2013 | Dannoux et al. | |
| 2013/0125592 A1 | 5/2013 | Bisson | |
| 2013/0127202 A1 | 5/2013 | Hart | |
| 2013/0242562 A1 | 9/2013 | Labrot | |
| 2013/0295357 A1 | 11/2013 | Cleary et al. | |
| 2013/0319046 A1 | 12/2013 | Cleary et al. | |
| 2013/0323415 A1 | 12/2013 | Brackley et al. | |
| 2014/0087159 A1 | 3/2014 | Cleary et al. ..... | B32B 17/10137 |
| 2014/0087193 A1 | 3/2014 | Cites et al. | |
| 2014/0089159 A1 | 3/2014 | Chellaboina et al. | |
| 2014/0089193 A1 | 3/2014 | Boding et al. | |
| 2014/0141217 A1 | 5/2014 | Gulati et al. | |
| 2014/0239034 A1 | 8/2014 | Cleary et al. | |
| 2014/0262002 A1 | 9/2014 | Suwa et al. | |
| 2014/0356604 A1 | 12/2014 | Borrelli et al. | |
| 2015/0064374 A1 | 3/2015 | Jain et al. | |
| 2015/0122406 A1 | 5/2015 | Fisher et al. | |
| 2015/0158275 A1 | 6/2015 | D'Errico et al. | |
| 2015/0158277 A1 | 6/2015 | Fisher et al. | |
| 2015/0174861 A1 | 6/2015 | Hasegawa et al. | |
| 2015/0192398 A1 | 7/2015 | Mitchell | |
| 2015/0232366 A1 | 8/2015 | Fredholm et al. | |
| 2015/0232367 A1 | 8/2015 | Joubaud et al. | |
| 2015/0251377 A1 | 9/2015 | Cleary et al. | |
| 2015/0274571 A1 | 10/2015 | Brennan et al. | |
| 2015/0321940 A1 | 11/2015 | Dannoux et al. | |
| 2016/0082705 A1 | 3/2016 | Fisher et al. | |
| 2016/0145139 A1 | 5/2016 | Fredholm et al. | |
| 2016/0207290 A1 | 7/2016 | Cleary et al. | |
| 2016/0207819 A1 | 7/2016 | Cleary et al. | |
| 2016/0207820 A1 | 7/2016 | Cleary et al. | |
| 2016/0250825 A1 | 9/2016 | Cleary et al. | |

FOREIGN PATENT DOCUMENTS

| | | |
|---|---|---|
| DE | 9211909 U1 | 9/1992 |
| DE | 4302327 A1 | 8/1994 |
| EP | 532478 A2 | 3/1993 |
| EP | 572077 A1 | 12/1993 |
| EP | 0669205 A1 | 8/1995 |
| EP | 957116 B1 | 6/2007 |
| EP | 2363285 A1 | 2/2011 |
| EP | 2281860 B9 | 9/2011 |
| JP | 1990261837 A | 10/1990 |

(56) References Cited

FOREIGN PATENT DOCUMENTS

| | | | | |
|---|---|---|---|---|
| JP | 11035349 | A | 2/1999 | ............ B32B 17/10 |
| JP | 2000177381 | A | 6/2000 | |
| JP | 2000280414 | A | 10/2000 | ............ B32B 17/10 |
| JP | 2003160737 | A | 6/2003 | |
| JP | 2006160562 | A | 6/2006 | |
| JP | 2007106659 | A | 4/2007 | ............ C03C 27/12 |
| JP | 2007261837 | A | 10/2007 | |
| JP | 04166363 | B2 | 10/2008 | ............ B32B 17/10 |
| JP | 2011530612 | A | 12/2011 | |
| JP | 2014012373 | A | 1/2014 | ............ B32B 17/10 |
| JP | 2015145464 | A | 8/2015 | |
| KR | 2010037215 | A | 4/2010 | ............ B32B 27/08 |
| KR | 1048272 | B1 | 7/2011 | ............ B32B 27/08 |
| KR | 2014134050 | A | 11/2014 | |
| KR | 1515691 | B1 | 4/2015 | |
| KR | 2015092510 | A | 8/2015 | |
| TW | 201245076 | A | 11/2012 | |
| WO | 8001051 | | 5/1980 | |
| WO | 1992020751 | A1 | 11/1992 | |
| WO | 1995023772 | A1 | 9/1995 | |
| WO | WO0138088 | A1 | 5/2001 | ............ B32B 17/10 |
| WO | 0226492 | A1 | 4/2002 | |
| WO | 2003078536 | A2 | 9/2003 | |
| WO | 2006086389 | | 8/2006 | |
| WO | 2006102049 | A2 | 9/2006 | |
| WO | 2006116440 | A2 | 11/2006 | |
| WO | 2007073520 | A2 | 6/2007 | |
| WO | 2010027041 | A1 | 3/2010 | |
| WO | 2010040014 | A1 | 4/2010 | |
| WO | WO2011103801 | A1 | 9/2011 | ............ B60J 1/02 |
| WO | 2012112856 | A1 | 8/2012 | |
| WO | 2013181505 | | 12/2013 | |
| WO | WO2013181484 | A1 | 12/2013 | ............ B32B 17/10 |
| WO | WO2013184897 | A1 | 12/2013 | ............ B32B 17/10 |
| WO | WO2014007313 | A1 | 1/2014 | ............ C03C 17/12 |
| WO | 2014058163 | A1 | 4/2014 | |
| WO | WO2014052229 | A1 | 4/2014 | ............ B32B 17/10 |
| WO | 2014084892 | A1 | 6/2014 | |
| WO | 2014120593 | A1 | 8/2014 | |

OTHER PUBLICATIONS

Patent Cooperation Treaty International Notification of Transmittal of the International Search Report and the Written Opinion of the International Searching Authority, international application No. PCT/US2014/053115: dated Jun. 2, 2015, 18 pages.

Patent Cooperation Treaty International Notification of Transmittal of the Invitation to Pay Additional Fees, international application No. PCT/US2014/053115: dated Dec. 12, 2014, 8 pages.

English Translation of CN201480059358.X Second Office Action dated Oct. 27, 2017, China Patent Office.

Zhao et al. "Glass Technolgy" Chemical Industry Press, 2006, pp. 334-338.

TW103129988 Search Report dated Feb. 7, 2018; 1 Page; Taiwan Patent Office.

English Translation of JP2016537843 Office Action dated May 15, 2018; 4 Pages; Japanese Patent Office.

\* cited by examiner

LIGHT-WEIGHT, HIGH STIFFNESS GLASS LAMINATE STRUCTURE

This application claims the benefit of priority to U.S. Application No. 61/871,928 filed Aug. 30, 2013, the content of which is incorporated herein by reference in its entirety.

BACKGROUND

Glass laminates can be used as windows and glazing in architectural and vehicle or transportation applications, including automobiles, rolling stock, locomotive and airplanes. Glass laminates can also be used as glass panels in balustrades and stairs, and as decorative panels or coverings for walls, columns, elevator cabs, kitchen appliances and other applications. As used herein, a glazing or a laminated glass structure can be a transparent, semi-transparent, translucent or opaque part of a window, panel, wall, enclosure, sign or other structure. Common types of glazing that are used in architectural and/or vehicular applications include clear and tinted laminated glass structures.

Conventional automotive glazing constructions for side panels typically include a 5 mm thick monolithic soda lime glass layer or two plies of 2.1 mm or 2.0 mm soda lime glass with an intermediate tri-layer acoustic interlayer. These constructions have certain advantages, including low cost and a sufficient impact resistance for automotive and other applications. However, because of their limited impact resistance and higher weight, these laminates exhibit poor performance characteristics, including a higher probability of breakage when struck by roadside debris, vandals and other objects of impact as well as well as lower fuel efficiencies for a respective vehicle.

As noted above such glass window panes are heavy and prone to breakage from rock strike or other forms of vandalism. Efforts have been made to replace the glass window panes with polymer window panes as they are inherently lighter in weight than the glass window panes and can be less prone to breakage. Polymer window panes are also prone to breakage and often cannot meet the Federal Railway Regulations for ballistic and block testing. Furthermore, polymer window panes are prone to scratches and must be replaced at regular intervals. Furthermore, polymer window panes are generally not capable of passing strict flammability tests, for example, one or more of the Federal Aviation Regulations, the European Regulations, and British Regulations.

In applications where strength is important, the strength of conventional glass can be enhanced by several methods, including coatings, thermal tempering, and chemical strengthening (ion exchange). Thermal tempering is conventionally employed in such applications with thick, monolithic glass sheets, and has the advantage of creating a thick compressive layer through the glass surface, typically 20 to 25% of the overall glass thickness. The magnitude of the compressive stress is relatively low, however, typically less than 100 MPa. Furthermore, thermal tempering becomes increasingly ineffective for relatively thin glass, e.g., less than about 2 mm. In contrast, ion exchange (IX) techniques can produce high levels of compressive stress in the treated glass, as high as about 1000 MPa at the surface, and is suitable for very thin glass.

Tempered glass (both thermally tempered and chemically tempered) has the advantage of being more resistant to breakage which can be desirable to enhance the reliability of laminated automobile glazing. In particular, thin, chemically-tempered glass can be desirable for use in making strong, lighter-weight auto glazing. Thus, there is a need to provide an improved automotive laminate structure. Furthermore, there is a need to provide an improved window system comprising a polymer, for example, that is capable of passing one or more of the Federal Aviation Regulations, the European Regulations, the British Regulations, and the Federal Railway Regulations.

SUMMARY

The embodiments disclosed herein generally relate to glazings or laminates having laminated glass. Significant weight savings can be achieved by replacing conventional monolithic glass with an exemplary laminate structure having multiple sheets of chemically strengthened glass (e.g., Gorilla® Glass) along with a polymer interlayer (e.g., standard or acoustic polyvinyl butryal). Simply replacing the conventional glass sheets in a laminate structure with thinner chemically strengthened glass can result in weight savings; however, the lowering of glass thickness along with a soft polymer interlayer can result in the decrease of overall structural rigidity of the laminated glass structure under mechanical loading as the elastic modulus of typical interlayer materials used in automotive side glass applications is approximately $10^4$ to $10^5$ times lower than that of glass.

Embodiments of the present disclosure can employ an exemplary polycarbonate thermoplastic polymer as an interlayer material for automotive side glass applications. The elastic modulus of polycarbonate can be approximately 30 times lower than that of Gorilla® Glass, and the density of polycarbonate can be comparable to standard polymer interlayers employed in the industry. Depending upon the thickness of the glass sheets in an exemplary embodiment, polycarbonate thickness can be selected to achieve maximum weight savings without compromising the mechanical rigidity of the exemplary laminated glass structure.

Thus some embodiments provide improved window panes comprising a polymer composition that can pass flammability tests according to one or more of the Federal Aviation Regulations, the European Regulations, and British Regulations and/or that can meet one or both of the ballistic and block tests of the Federal Railway Regulations. These regulations are difficult for polymer compositions to pass and, to date, it is believed that all window panes comprising a polymer have failed the British regulations. Accordingly, an improved multilayer system was developed comprising a hardened glass, an interlayer, and a polymer layer. In various configurations, the multilayer system is able to pass one or more of desired regulatory tests. The multilayer system is light weight as compared to their glass window pane counter parts and provides good scratch resistance. It is noted that while considered for window panes, the disclosed multilayer structure can likewise be used for doors (such as rail doors, platform doors, and elevator doors), and in other applications with similar requirements such as aircraft interior glazing, heavy truck glazing, agricultural vehicle glazing, bus glazing, and automotive glazing. It is also envisioned that the same or similar polymer formulations and laminate stack ups will meet the needs for building and construction glazing.

In accordance with one or more embodiments herein, thin light-weight glass constructions are provided for a plurality of transportation, architectural or other applications. In some embodiment, thin light-weight glass constructions are provided for automotive side windows, sunroofs, and the like, and can include thin chemically strengthened glass (e.g., Gorilla® Glass) with a polycarbonate as an interlayer material and additional polymer interlayers (e.g., ethylene-vinyl acetate (EVA) or the like) as intermediate layers between the polycarbonate and glass sheet(s). In some embodiments, polycarbonate can impart a desired mechanical rigidity to exemplary thin side window embodiments. In other embodiments, the thickness of the polycarbonate can be selected based upon outer glass sheet thicknesses so as not to alter side window load-deflection characteristics. Exemplary polymer layers on either side of the polycarbonate can promote adhesion between the glass sheet(s) and polycarbonate and can also provide additional acoustic performance for an exemplary laminate structure.

In some embodiments, a laminate structure is provided having a first glass layer, a second glass layer, and a polymer interlayer structure intermediate the first and second glass layers. The polymer interlayer structure can include a first polymeric layer adjacent to the first glass layer, a second polymeric layer adjacent to the second glass layer, and a polymeric rigid core intermediate the first and second polymeric layers, whereby the first glass layer is comprised of a strengthened glass.

In other embodiments, a laminate structure is provided having a first chemically strengthened glass layer, a second chemically strengthened glass layer, and a polymer interlayer structure intermediate the first and second glass layers. The polymer interlayer structure can include a first polymeric layer adjacent to the first glass layer, a second polymeric layer adjacent to the second glass layer, and a polymeric rigid core intermediate the first and second polymeric layers.

In some embodiments, a multilayer article is provided comprising a first glass layer, wherein the first glass layer is comprised of a thin, chemically strengthened glass having a surface compressive stress of between about 250 MPa and about 350 MPa and a depth of layer of compressive stress greater than 60 µm. Such an article includes a first interlayer and a polymer layer, where the polymer layer comprises a polysiloxane, a polyester, a polycarbonate, a copolymer comprising one or more of the foregoing, or a blend comprising one or more of the foregoing. A first glass layer can be from 0.5 to 1.5 mm, a first interlayer from 0.2 to 1.4 mm, and a polymer layer from 2 to 15 mm.

In some embodiments, a double pane window is provided comprising a first pane comprising a first glass layer, wherein the first glass layer is comprised of a thin, chemically strengthened glass having a surface compressive stress of between about 250 MPa and about 350 MPa and a depth of layer (DOL) of compressive stress greater than 60 µm, and a first interlayer located in between the first glass layer and a first polymer layer, where the first polymer layer comprises a polysiloxane, a polyester, a polycarbonate, a copolymer comprising one or more of the foregoing, or a blend comprising one or more of the foregoing. The window further comprises a second pane comprising a third glass layer, wherein the third glass layer is comprised of a thin, chemically strengthened glass having a surface compressive stress of between about 250 MPa and about 350 MPa and a depth of layer (DOL) of compressive stress greater than 60 µm, and a third interlayer located in between the third glass layer and a second polymer layer, where the second polymer layer comprises a polysiloxane, a polyester, a polycarbonate, a copolymer comprising one or more of the foregoing, or a blend comprising one or more of the foregoing. The window may also include a gap located in between the first pane and the second pane, and a frame surrounding an edge of the first pane and the second pane.

It is to be understood that both the foregoing general description and the following detailed description present embodiments of the present disclosure, and are intended to provide an overview or framework for understanding the nature and character of the claimed subject matter. The accompanying drawings are included to provide a further understanding of the present disclosure, and are incorporated into and constitute a part of this specification. The drawings illustrate various embodiments and together with the description serve to explain the principles and operations of the claimed subject matter.

BRIEF DESCRIPTION OF THE DRAWINGS

For the purposes of illustration, there are forms shown in the drawings that are presently preferred, it being understood, however, that the embodiments disclosed and discussed herein are not limited to the precise arrangements and instrumentalities shown.

DETAILED DESCRIPTION

Figure 1:
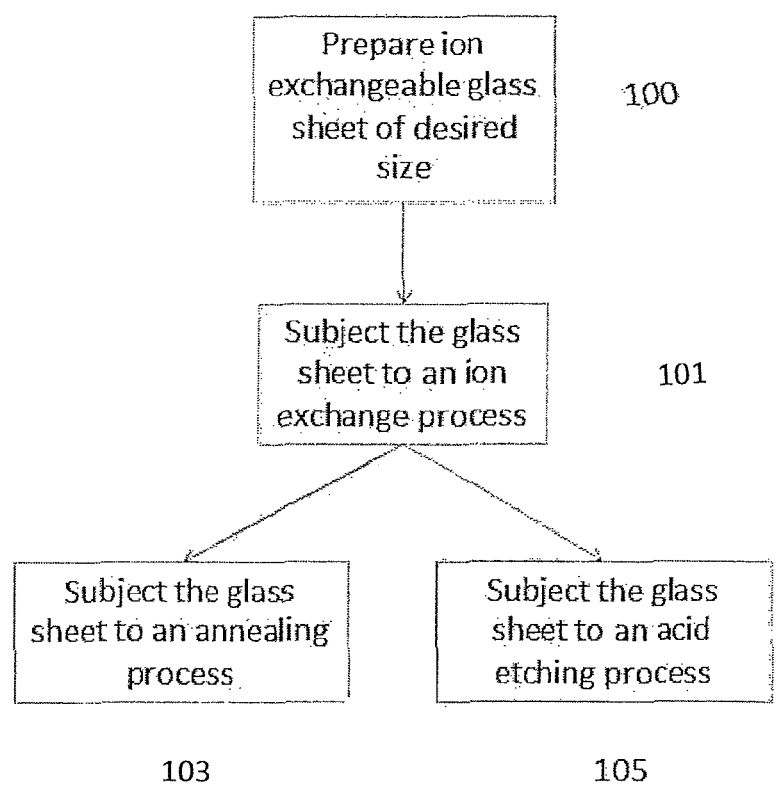
FIG. 1 is a flow diagram illustrating some embodiments of the present disclosure.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other.

Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range. As used herein, the indefinite articles "a," and "an," and the corresponding definite article "the" mean "at least one" or "one or more," unless otherwise specified The following description of the present disclosure is provided as an enabling teaching thereof and its best, currently-known embodiment. Those skilled in the art will recognize that many changes can be made to the embodiment described herein while still obtaining the beneficial results of the present disclosure. It will also be apparent that some of the desired benefits of the present disclosure can be obtained by selecting some of the features of the present disclosure without utilizing other features. Accordingly, those of ordinary skill in the art will recognize that many modifications and adaptations of the present disclosure are possible and can even be desirable in certain circumstances and are part of the present disclosure. Thus, the following description is provided as illustrative of the principles of the present disclosure and not in limitation thereof.

FIG. 1 is a flow diagram illustrating some embodiments of the present disclosure. With reference to FIG. 1, some embodiments include the application of one or more processes for producing a relatively thin glass sheet (on the order of about 2 mm or less) having certain characteristics, such as relatively moderate compressive stress (CS), relatively high depth of compressive layer (DOL), and/or moderate central tension (CT). The process includes preparing a glass sheet capable of ion exchange (step 100). The glass sheet can then be subjected to an ion exchange process (step 101), and thereafter the glass sheet can be subjected to an anneal process (step 103) if necessary. Of course, if the CS and DOL of the glass sheet is desired at the levels resulting from the ion exchange step (step 101), then no annealing step (step 103) is required. In other embodiments, an acid etching process (step 105) can be used to increase the CS on appropriate glass surfaces.

The ion exchange process 101 can involve subjecting the glass sheet to a molten salt bath including $KNO_3$, preferably relatively pure $KNO_3$ for one or more first temperatures within the range of about 400-500° C. and/or for a first time period within the range of about 1-24 hours, such as, but not limited to, about 8 hours. It is noted that other salt bath compositions are possible and would be within the skill level of an artisan to consider such alternatives. Thus, the disclosure of $KNO_3$ should not limit the scope of the claims appended herewith. Such an exemplary ion exchange process can produce an initial compressive stress (iCS) at the surface of the glass sheet, an initial depth of compressive layer (iDOL) into the glass sheet, and an initial central tension (iCT) within the glass sheet.

In general, after an exemplary ion exchange process, the initial compressive stress (iCS) can exceed a predetermined (or desired) value, such as being at or greater than about 500 MPa, and can typically reach 600 MPa or higher, or even reach 1000 MPa or higher in some glasses and under some processing profiles. Alternatively, after an exemplary ion exchange process, initial depth of compressive layer (iDOL) can be below a predetermined (or desired) value, such as being at or less than about 75 μm or even lower in some glasses and under some processing profiles. Alternatively, after an exemplary ion exchange process, initial central tension (iCT) can exceed a predetermined (or desired) value, such as above a predetermined frangibility limit of the glass sheet, which can be at or above about 40 MPa, or more particularly at or above about 48 MPa in some glasses.

If the initial compressive stress (iCS) exceeds a desired value, initial depth of compressive layer (iDOL) is below a desired value, and/or initial central tension (iCT) exceeds a desired value, this can lead to undesirable characteristics in a final product made using the respective glass sheet. For example, if the initial compressive stress (iCS) exceeds a desired value (reaching for example, 1000 MPa), then facture of the glass under certain circumstances might not occur. Although this may be counter-intuitive, in some circumstances the glass sheet should be able to break, such as in an automotive glass application where the glass must break at a certain impact load to prevent injury.

Further, if the initial depth of compressive layer (iDOL) is below a desired value, then under certain circumstances the glass sheet can break unexpectedly and under undesirable circumstances. Typical ion exchange processes can result in an initial depth of compressive layer (iDOL) being no more than about 40-60 μm, which can be less than the depth of scratches, pits, etc., developed in the glass sheet during use. For example, it has been discovered that installed automotive glazing (using ion exchanged glass) can develop external scratches reaching as deep as about 75 μm or more due to exposure to abrasive materials such as silica sand, flying debris, etc., within the environment in which the glass sheet is used. This depth can exceed the typical depth of compressive layer, which can lead to the glass unexpectedly fracturing during use.

Finally, if the initial central tension (iCT) exceeds a desired value, such as reaching or exceeding a chosen frangibility limit of the glass, then the glass sheet can break unexpectedly and under undesirable circumstances. For example, it has been discovered that a 4 inch×4 inch×0.7 mm sheet of Corning Gorilla® Glass exhibits performance characteristics in which undesirable fragmentation (energetic failure into a large number of small pieces when broken) occurs when a long single step ion exchange process (8 hours at 475° C.) was performed in pure $KNO_3$. Although a DOL of about 101 μm was achieved, a relatively high CT of 65 MPa resulted, which was higher than the chosen frangibility limit (48 MPa) of the subject glass sheet.

In accordance with one or more embodiments, however, after the glass sheet has been subject to ion exchange, the glass sheet can be subjected to an annealing process 104 by elevating the glass sheet to one or more second temperatures for a second period of time. For example, the annealing process 104 can be carried out in an air environment, can be performed at second temperatures within the range of about 400-500° C., and can be performed in a second time period within the range of about 4-24 hours, such as, but not limited to, about 8 hours. The annealing process 104 can thus cause at least one of the initial compressive stress (iCS), the initial depth of compressive layer (iDOL), and the initial central tension (iCT) to be modified.

For example, after the annealing process 104, the initial compressive stress (iCS) can be reduced to a final compressive stress (fCS) which is at or below a predetermined value. By way of example, the initial compressive stress (iCS) can be at or greater than about 500 MPa, but the final compressive stress (fCS) can be at or less than about 400 MPa, 350 MPa, or 300 MPa. It is noted that the target for the final compressive stress (fCS) can be a function of glass thickness as in thicker glass a lower fCS can be desirable, and in thinner glass a higher fCS can be tolerable.

Additionally, after the annealing process 104, the initial depth of compressive layer (iDOL) can be increased to a final depth of compressive layer (fDOL) at or above the predetermined value. By way of example, the initial depth of compressive layer (iDOL) can be at or less than about 75 μm, and the final depth of compressive layer (fDOL) can be at or above about 80 μm or 90 μm, such as 100 μm Or more.

Alternatively, after the annealing process 104, the initial central tension (iCT) can be reduced to a final central tension (fCT) at or below the predetermined value. By way of example, the initial central tension (iCT) can be at or above a chosen frangibility limit of the glass sheet (such as between about 40-48 MPa), and the final central tension (fCT) can be below the chosen frangibility limit of the glass sheet. Additional examples for generating exemplary ion exchangeable glass structures are described in co-pending U.S. application Ser. No. 13/626,958, filed Sep. 26, 2012 and U.S. application Ser. No. 13/926,461, filed Jun. 25, 2013 the entirety of each being incorporated herein by reference.

As noted above the conditions of the ion exchange step and the annealing step can be adjusted to achieve a desired compressive stress at the glass surface (CS), depth of compressive layer (DOL), and central tension (CT). The ion exchange step can be carried out by immersion of the glass sheet into a molten salt bath for a predetermined period of time, where ions within the glass sheet at or near the surface thereof are exchanged for larger metal ions, for example, from the salt bath. By way of example, the molten salt bath can include $KNO_3$, the temperature of the molten salt bath can be within the range of about 400-500° C., and the predetermined time period can be within the range of about 1-24 hours, and preferably between about 2-8 hours. The incorporation of the larger ions into the glass strengthens the sheet by creating a compressive stress in a near surface region. A corresponding tensile stress can be induced within a central region of the glass sheet to balance the compressive stress.

By way of further example, sodium ions within the glass sheet can be replaced by potassium ions from the molten salt bath, though other alkali metal ions having a larger atomic radius, such as rubidium or cesium, can also replace smaller alkali metal ions in the glass. According to some embodiments, smaller alkali metal ions in the glass sheet can be replaced by Ag+ ions. Similarly, other alkali metal salts such as, but not limited to, sulfates, halides, and the like can be used in the ion exchange process.

The replacement of smaller ions by larger ions at a temperature below that at which the glass network can relax produces a distribution of ions across the surface of the glass sheet resulting in a stress profile. The larger volume of the incoming ion produces a compressive stress (CS) on the surface and tension (central tension, or CT) in the center region of the glass. The compressive stress is related to the central tension by the following approximate relationship:

$$CS = CT\left(\frac{t - 2DOL}{DOL}\right)$$

where t represents the total thickness of the glass sheet and DOL represents the depth of exchange, also referred to as depth of compressive layer.

In some embodiments, acid etching (step 105) of a glass surface can reduce the number, size and severity of flaws in the respective surface of the glass sheet. Surface flaws act as fracture sites in glass sheets. Reducing the number, the size and severity of the flaws in these surfaces can remove and minimize the size of potential fracture initiation sites in these surfaces to thereby strengthen the surface of the respective glass sheets. The use of an acid etch surface treatment can comprise contacting one surface of a glass sheet with an acidic glass etching medium and can be versatile, readily tailored to most glasses, and readily applied to both planar and complex cover glass sheet geometries. Further, exemplary acid etching has been found to be effective to reduce strength variability, even in glass having a low incidence of surface flaws, including up-drawn or down-drawn (e.g., fusion-drawn) glass sheet that are conventionally thought to be largely free of surface flaws introduced during manufacture or during post-manufacturing processing. An exemplary acid treatment step can provide a chemical polishing of a glass surface that can alter the size, alter the geometry of surface flaws, and/or reduce the size and number of surface flaws but have a minimal effect on the general topography of the treated surface. In general, acid etching treatments can be employed to remove not more than about 4 μm of surface glass, or in some embodiments not more than 2 μm of surface glass, or not more than 1 μm of surface glass. The acid etch treatment can be advantageously performed prior to lamination to protect the respective surface from the creation of any new flaws.

Acid removal of more than a predetermined thickness of surface glass from chemically tempered glass sheet should be avoided to ensure that the thickness of the surface compression layer and the level of surface compressive stress provided by that layer are not unacceptably reduced as this could be detrimental to the impact and flexural damage resistance of a respective glass sheet. Additionally, excessive etching of the glass surface can increase the level of surface haze in the glass to objectionable levels. For window, automotive glazing, and consumer electronics display applications, typically no or very limited visually detectable surface haze in the glass cover sheet for the display is permitted.

A variety of etchant chemicals, concentrations, and treatment times can be used to achieve a desirable level of surface treatment and strengthening in embodiments of the present disclosure. Exemplary chemicals useful for carrying out the acid treatment step include fluoride-containing aqueous treating media containing at least one active glass etching compound including, but not limited to, HF, combinations of HF with one or more of HCL, $HNO_3$ and $H_2SO_4$, ammonium bifluoride, sodium bifluoride and other suitable compounds. For example, an aqueous acidic solution having 5 vol. % HF (48%) and 5 vol. % $H_2SO_4$ (98%) in water can improve the ball drop performance of ion-exchange-strengthened alkali aluminosilicate glass sheet having a thickness in the range of about 0.5 mm to about 1.5 mm using treatment times as short as one minute in duration. It should be noted that exemplary glass layers not subjected to ion-exchange strengthening or thermal tempering, whether before or after acid etching, can require different combinations of etching media to achieve large improvements in ball drop test results.

Maintaining adequate control over the thickness of the glass layer removed by etching in HF-containing solutions can be facilitated if the concentrations of HF and dissolved glass constituents in the solutions are closely controlled. While periodic replacement of the entire etching bath to restore acceptable etching rates is effective for this purpose, bath replacement can be expensive and the cost of effectively treating and disposing of depleted etching solutions can be high. Exemplary methods for etching glass layers is described in co-pending International Application No. PCT/US13/43561, filed May 31, 2013, the entirety of which is incorporated herein by reference.

Satisfactorily strengthened glass sheets or layers can retain a compressive surface layer having a DOL of at least 30 μm or even 40 μm, after surface etching, with the surface layer providing a peak compressive stress level of at least 500 MPa, or even 650 MPa. To provide thin alkali aluminosilicate glass sheets offering this combination of properties, sheet surface etching treatments of limited duration can be required. In particular, the step of contacting a surface of the glass sheet with an etching medium can be carried out for a period of time not exceeding that required for effective removal of 2 μm of surface glass, or in some embodiments not exceeding that required for effective removal of 1 μm of surface glass. Of course, the actual etching time required to limit glass removal in any particular case can depend upon the composition and temperature of the etching medium as well as the composition of the solution and the glass being treated; however, treatments effective to remove not more than about 1 μm or about 2 μm of glass from the surface of a selected glass sheet can be determined by routine experiment.

An alternative method for ensuring that glass sheet strengths and surface compression layer depths are adequate can involve tracking reductions in surface compressive stress level as etching proceeds. Etching time can then be controlled to limit reductions in surface compressive stress necessarily caused by the etching treatment. Thus, in some embodiments the step of contacting a surface of a strengthened alkali aluminosilicate glass sheet with an etching medium can be carried out for a time not exceeding a time effective to reduce the compressive stress level in the glass sheet surface by 3% or another acceptable amount. Again, the period of time suitable for achieving a predetermined amount of glass removal can depend upon the composition and temperature of the etching medium as well as the composition of the glass sheet, but can also readily be determined by routine experiment. Additional details regarding glass surface acid or etching treatments can be found in co-pending U.S. patent application Ser. No. 12/986,424 filed Jan. 7, 2011, the entirety of which is hereby incorporated by reference.

Additional etching treatments can be localized in nature. For example, surface decorations or masks can be placed on a portion(s) of the glass sheet or article. The glass sheet can then be etched to increase surface compressive stress in the area exposed to the etching but the original surface compressive stress (e.g., the surface compressive stress of the original ion exchanged glass) can be maintained in the portion(s) underlying the surface decoration or mask. Of course, the conditions of each process step can be adjusted based on the desired compressive stress at the glass surface(s), desired depth of compressive layer, and desired central tension.

Any number of specific glass compositions can be employed in producing the glass sheet. For example, ion-exchangeable glasses suitable for use in the embodiments herein include alkali aluminosilicate glasses or alkali aluminoborosilicate glasses, though other glass compositions are contemplated. As used herein, "ion exchangeable" means that a glass is capable of exchanging cations located at or near the surface of the glass with cations of the same valence that are either larger or smaller in size.

For example, a suitable glass composition comprises $SiO_2$, $B_2O_3$ and $Na_2O$, where $(SiO_2+B_2O_3)\geq 66$ mol. %, and $Na_2O\geq 9$ mol. %. In an embodiment, the glass sheets include at least 6 wt. % aluminum oxide. In a further embodiment, a glass sheet includes one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for forming hybrid glass laminates comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. %≤$(Li_2O+Na_2O+K_2O)$≤20 mol. % and 0 mol. %≤(MgO+CaO)≤10 mol. %.

A still further example glass composition comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. %≤$(Li_2O+Na_2O+K2O)$≤18 mol. % and 2 mol. %≤(MgO+CaO)≤7 mol. %.

In another embodiment, an alkali aluminosilicate glass comprises, consists essentially of, or consists of: 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

In a particular embodiment, an alkali aluminosilicate glass comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $$\frac{Al_2O_3 + B_2O_3}{\sum \text{modifiers}} > 1,$$

where in the ratio the components are expressed in mol. % and the modifiers are alkali metal oxides. This glass, in particular embodiments, comprises, consists essentially of, or consists of: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O_3 + B_2O_3}{\sum \text{modifiers}} > 1.$$

In yet another embodiment, an alkali aluminosilicate glass substrate comprises, consists essentially of, or consists of: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; wherein 12 mol. %≤$Li_2O+Na_2O+K_2O$≤20 mol. % and 0 mol. %≤MgO+CaO≤10 mol. %.

In still another embodiment, an alkali aluminosilicate glass comprises, consists essentially of, or consists of: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $SiO_2+B_2O_3+CaO$ 69 mol. %; $Na_2O+K_2O+B_2O_3+MgO+CaO+SrO$>10 mol. %; 5 mol. %≤MgO+CaO+SrO≤8 mol. %; $(Na_2O+B_2O_3)$−$Al_2O_3$≤2 mol. %; 2 mol. %≤$Na_2O$−$Al_2O_3$≤6 mol. %; and 4 mol. %≤$(Na_2O+K_2O)$−$Al_2O_3$≤10 mol. %. Additional compositions of exemplary glass structures are described in co-pending U.S. application Ser. No. 13/626,958, filed Sep. 26, 2012 and U.S. application Ser. No. 13/926,461, filed Jun. 25, 2013 the entirety of each being incorporated herein by reference.

Figure 2:
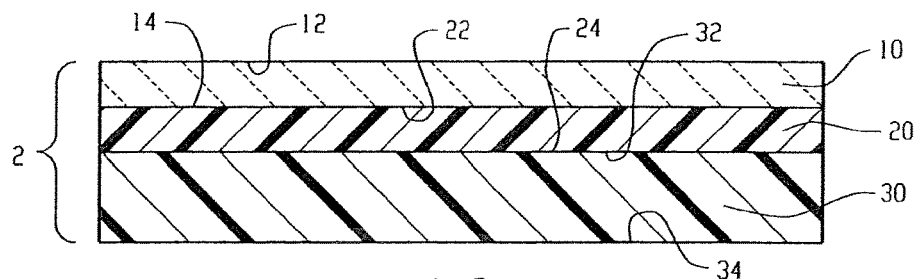
FIG. 2 is a cross-sectional illustration of a single sided multilayer article.

FIG. 2 is a cross-sectional illustration of a single sided multilayer article. With reference to FIG. 2, an exemplary multilayer article can be a single sided article 2 with a polymer layer 30 having a polymer side 32 and polymer side 34, an interlayer 20 that has an interlayer side 22 and interlayer side 24, and a glass layer 10 that has a glass side 12 and glass side 14. FIG. 2 illustrates that the glass side 14 is in direct contact with the interlayer side 22, and the interlayer side 24 is in direct contact with the polymer side 32. The total thickness of a single sided multilayer article can be from about 2 to 20 mm, specifically, from about 4 to 16 mm, more specifically, from about 5 to 14 mm and all sub-ranges in between. In an embodiment a decorative layer is disposed onto the polymer side 32. In another embodiment a decorative layer is disposed onto the glass side 14. In an embodiment, a decorative layer is disposed onto the polymer side 32 and the glass side 14. It is also contemplated that a decorative layer could be disposed onto glass side 12 and/or polymer side 34 separately or in addition to having decorative layers on the aforementioned layers of the multilayer article.

Figure 3:
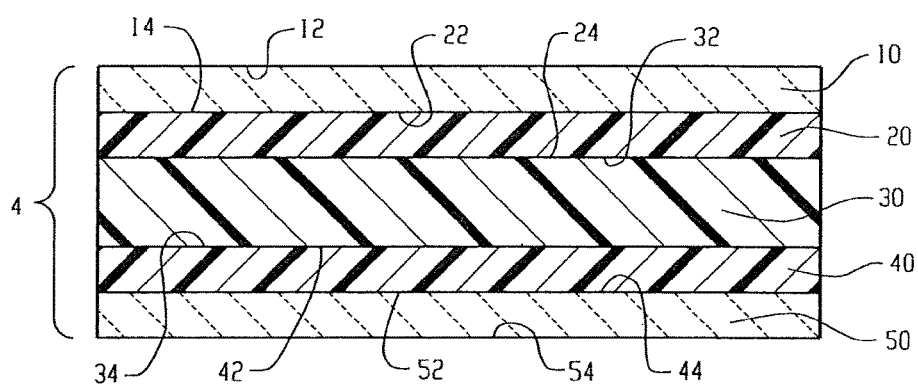
FIG. 3 is a cross-sectional illustration of a dual sided multilayer article.

The multilayer article can be a dual sided article that comprises a polymer layer with a polymer side A and a polymer side B; a first glass layer located on the polymer side A with a first interlayer located in between the first glass layer and the polymer layer; and a second glass layer located on the polymer side B with a second interlayer located in between the first glass layer and the polymer layer. FIG. 3 is a cross-sectional illustration of a dual sided multilayer article 4 with a polymer layer 30 that has a polymer side 32 and polymer side 34, an interlayer 20 that has an interlayer side 22 and interlayer side 24, an interlayer 40 that has an interlayer side 42 and interlayer side 44, a glass layer 50 that has a glass side 52 and glass side 54, and a glass layer 10 that has a glass side 12 and glass side 14. FIG. 3 illustrates that the glass side 14 is in direct contact with the interlayer side 22, the interlayer side 24 is in direct contact with the polymer side 32, the polymer side 34 is in direct contact with the interlayer side 42, and the interlayer side 44 is in direct contact with the glass side 52. It is noted that one or both of the glass layers 10 and 50 can comprise hardened glass. The total thickness of a dual sided multilayer article can be from about 2 to 25 mm, specifically, from about 4 to 18 mm, more specifically, from about 5 to 14 mm and all sub-ranges in between. In an embodiment a decorative layer is disposed onto the polymer side 32 and/or 34. In another embodiment a decorative layer is disposed onto the glass side 14 and/or 52. In an embodiment, a decorative layer is disposed onto the polymer side 32 and/or polymer side 34 and/or the glass side 14 and/or the glass side 52. It is also contemplated that a decorative layer could be disposed onto glass side 12 and/or 54 separately or in addition to having decorative layers on the aforementioned layers of the multilayer article.

With continued reference to FIGS. 2 and 3, some embodiments of the present disclosure can include one layer of chemically strengthened glass (FIG. 2) or two layers of chemically strengthened glass (FIG. 3), e.g., Gorilla® Glass, that have been heat treated, ion exchanged, annealed, and/or chemically etched as described above. In additional embodiments, one or both layers of chemically strengthened glass, as applicable, have only been heat treated and ion exchanged. In some embodiments, a laminate or article 4 can be comprised of an outer layer 10 of glass having a thickness of less than or equal to about 1.0 mm and having a residual surface CS level of between about 250 MPa to about 350 MPa with a DOL of greater than 60 microns if annealed after an ion exchange process. In other embodiments, the CS level of the outer layer 10 can be greater than 350 MPa and can be between 400 MPa and 900 MPa depending upon the processes performed on the embodiment as described above. The laminate or article 4 also includes a polymeric interlayer comprising a rigid polymeric core 30 and two outer polymeric layers 20, 40. The article 4 further includes an inner layer of glass 50 also having a thickness of less than or equal to about 1.0 mm and having a residual surface CS level of between about 250 MPa to about 350 MPa with a DOL of greater than 60 microns if annealed after an ion exchange process. In other embodiments, the CS level of the inner layer 50 can be greater than 350 MPa and can be between 400 MPa and 900 MPa depending upon the processes performed on the embodiment as described above. In some embodiments, the rigid core 30 is formed from a polycarbonate material or other suitable material. This rigid core 30 can impart the desired mechanical rigidity to the exemplary article 4 and any resulting window construction therefrom. The thickness of polycarbonate can be selected based upon outside glass ply thicknesses so as not to alter the automotive window load-deflection characteristic. Exemplary thicknesses of the polymeric interlayers can range in thicknesses from 0.1 mm to 0.3 mm to 0.5 mm to 0.8 mm or more. Exemplary thicknesses of the rigid core 30 can range in thicknesses from 2.0 mm to 3.8 mm to 5.0 mm or more. Exemplary materials for the two outer polymeric layers 20, 40 and also the rigid polymeric core 30 will be discussed in further detail below but include and are not limited to poly vinyl butyral (PVB), polycarbonate, acoustic PVB, ethylene vinyl acetate (EVA), thermoplastic polyurethane (TPU), ionomer, a thermoplastic material, and combinations thereof. Exemplary thicknesses of the polymeric interlayers can range in thicknesses from 0.1 mm to 0.3 mm to 0.5 mm to 0.8 mm or more. Exemplary outer polymeric layers 20, 40 on either side of the rigid polymeric core 30 can promote adhesion between the glass layers 10, 50 and the rigid polymeric core 30 as well as add to the respective window acoustic performance.

In another embodiment of the present disclosure, at least one layer of thin but high strength glass can be used to construct an exemplary laminate structure. In such an embodiment, chemically strengthened glass, e.g., Gorilla® Glass, can be used for the outer layer 10 and/or inner layer 50 of glass for an exemplary article 4. In another embodiment, the inner layer 50 of glass can be conventional soda lime glass, annealed glass, or the like. Exemplary thicknesses of the outer and/or inner layers 10, 50 can range in thicknesses from 0.55 mm to 1.5 mm to 2.0 mm or more. Additional thicknesses can range from about 0.1 mm to 2.0 mm, 0.1 to 0.3 mm, 0.1 to 0.5 mm, 0.1 to 1.5 mm or more and all sub-ranges in between. Additionally, the thicknesses of the outer and inner layers 10, 50 can be different in a laminate structure or article 4. Exemplary glass layers can be made by fusion drawing, as described in U.S. Pat. Nos. 7,666,511, 4,483,700 and 5,674,790, the entirety of each being incorporated herein by reference, and then chemically strengthening such drawn glass. Exemplary glass layers 10, 50 can thus possess a deep DOL of CS and can present a high flexural strength, scratch resistance and impact resistance. Exemplary embodiments can also include acid etched or flared surfaces to increase the impact resistance and increasing the strength of such surfaces by reducing the size and severity of flaws on these surfaces. If etched immediately prior to lamination, the strengthening benefit of etching or flaring can be maintained on surfaces bonded to the interlayer.

In some experiments, flat rectangular glass panels were evaluated using non-linear finite element analysis calculations. The dimension of the glass panels were approximately 1000 mm by 800 mm which is similar to that of a Ford Taurus side window. The glass panels were assumed to be supported on all four edges with a uniform pressure load of approximately 2000 Pa (0.3 psi) applied on one of the faces of the glass panel to approximate typical windload pressures. In one experiment, an approximately 5 mm thick conventional monolithic glass was used as a benchmark to compare the deflection of the monolithic glass sheet with embodiments of the present disclosure. In another experiment, a two ply laminate construction having two 2.1 mm glass sheets was also used as a benchmark to compare the deflection of this conventional laminate structure with embodiments of the present disclosure. Table A provided below summarizes the deflection of conventional 5 mm monolithic glass and conventional two ply laminate constructions having two 2.1 mm glass sheets.

TABLE A

|  | Deflection (mm) | Mass (Kg/lbs) |
| --- | --- | --- |
| 5 mm monolith | 5.4 | 10/22 |
| Two ply (2.1/2.1 mm) laminate structure | 7.4 | 8.8/19.3 |

The values provided in Table A above were used as a benchmark to evaluate laminate constructions according to embodiments of the present disclosure. Table B provided below shows mechanical properties of various materials used in the experiments.

TABLE B

|  | Elastic modulus (MPa) | Poisson's ratio | Density (Kg/m$^3$) |
| --- | --- | --- | --- |
| Chemically strengthened glass | 71,700 | 0.21 | 2440 |
| Polycarbonate | 2200 | 0.37 | 1210 |
| EVA | 10 (at 1 Hz at 20° C.) | 0.49 | 1000 |
| Standard PVB | 15 (at 1 Hz at 20° C.) | 0.49 | 1069 |
| Acoustic PVB | 3 (at 1 Hz at 20° C.) | 0.49 | 1069 |

Figure 4:
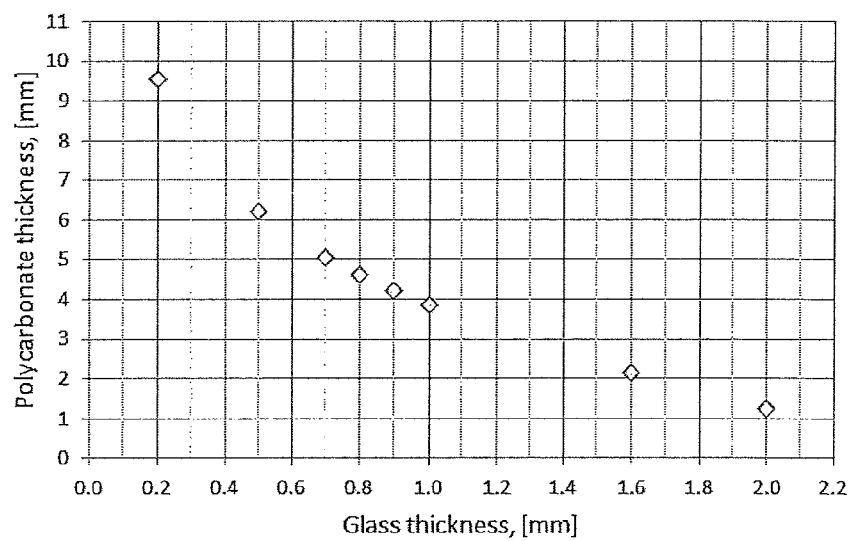
FIG. 4 is a plot of polycarbonate thickness versus glass thickness.

FIG. 4 is a plot of polycarbonate thickness versus glass thickness. With reference to FIG. 4, a plot of glass thickness versus polycarbonate thickness in a laminated glass panel is illustrated that will have a same deflection as a 5.0 mm monolith glass equal to 5.4 mm for the pressure and support/loading conditions described above. The curve generally illustrates the thickness of an exemplary rigid or polycarbonate core necessary to achieve a deflection of 5.4 mm when modifying the thickness of outer chemically strengthened glass layers. Thus, as the thickness of outer glass layers in an embodiment of the present disclosure is lowered, the thickness of the rigid core, e.g., polycarbonate, should be increased to achieve the same deflection as a 5 mm monolithic structure.

Figure 5:
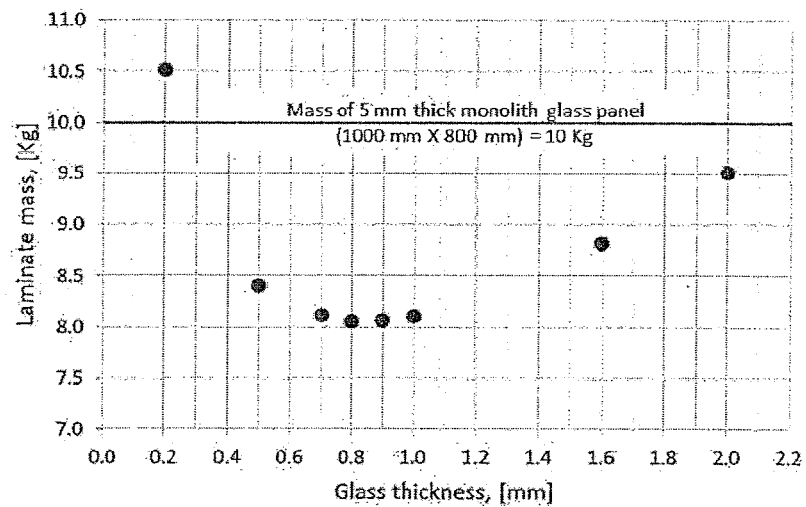
FIG. 5 is a plot of polycarbonate laminate mass for different outer glass thicknesses.

FIG. 5 is a plot of polycarbonate laminate mass for different outer glass thicknesses. With reference to FIG. 5, a plot of outer glass ply thickness versus total laminate weight is illustrated. The plot generally indicates that, compared to a 5 mm monolithic glass structure, maximum weight savings of approximately 20% can be achieved when using 0.8 mm thick chemically strengthened glass (e.g., Gorilla® Glass).

In such an embodiment, the laminate structure could require the use of an approximately 4.5 mm thick polycarbonate core (see FIG. 4) to achieve a desired deflection. It also follows that if 0.7 mm thick chemically strengthened glass were utilized (e.g., Gorilla® Glass), the weight savings would be approximately 19% and the use of an approximately 5 mm thick polycarbonate core should be employed.

Figure 6:
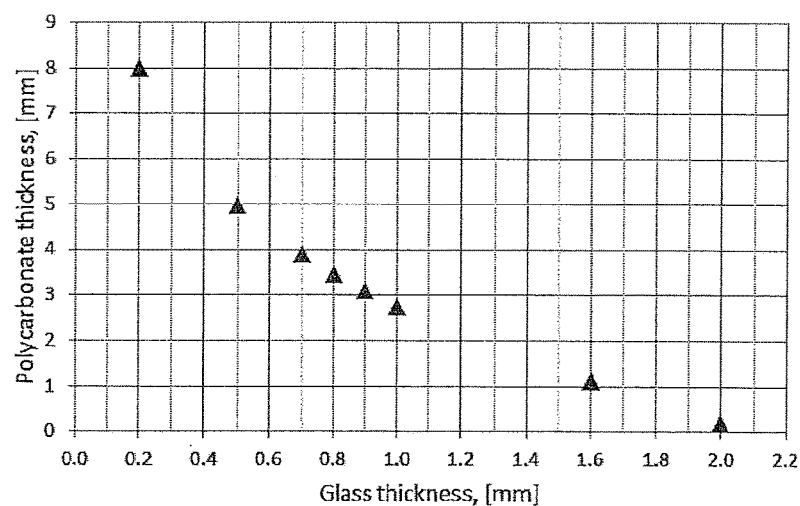
FIG. 6 is another plot of polycarbonate thickness versus glass thickness.
Figure 7:
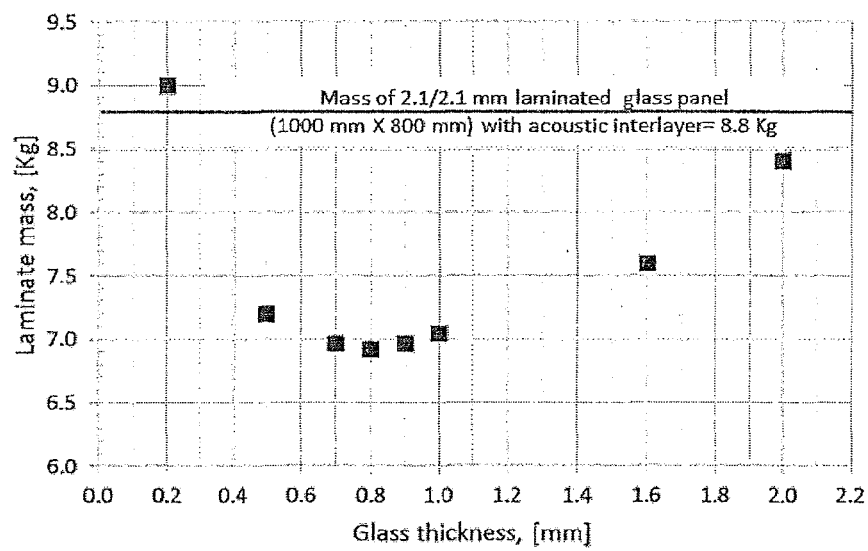
FIG. 7 is another plot of polycarbonate laminate mass for different outer glass thicknesses.

FIG. 6 is another plot of polycarbonate thickness versus glass thickness. FIG. 7 is another plot of polycarbonate laminate mass for different outer glass thicknesses. With reference to FIG. 6, a plot of glass thickness versus polycarbonate thickness in a laminated glass panel is illustrated that will have a same deflection as a conventional two ply laminated structure (two sheets of 2.1 mm soda lime glass) for the pressure and support/loading conditions described above. With reference to FIG. 7, a plot of outer glass ply thickness versus total laminate weight is illustrated for this same conventional two ply laminated structure. These two plots indicate that when using an approximately 0.7 mm thick chemically strengthened glass (e.g., Gorilla® Glass) as an outer glass layer, a 21.5% weight savings can be achieved with an approximately 4 mm thick polycarbonate core. Such an exemplary construction would have the same deflection as a conventional two ply laminate structure under pressure and support conditions discussed above. Thus, for embodiments of the present disclosure, a weight reduction of as much as 20% or more can be achieved over conventional structures. Such exemplary constructions can also meet customer deflection and acoustic requirements as well as pass standard certification tests.

Figure 8:
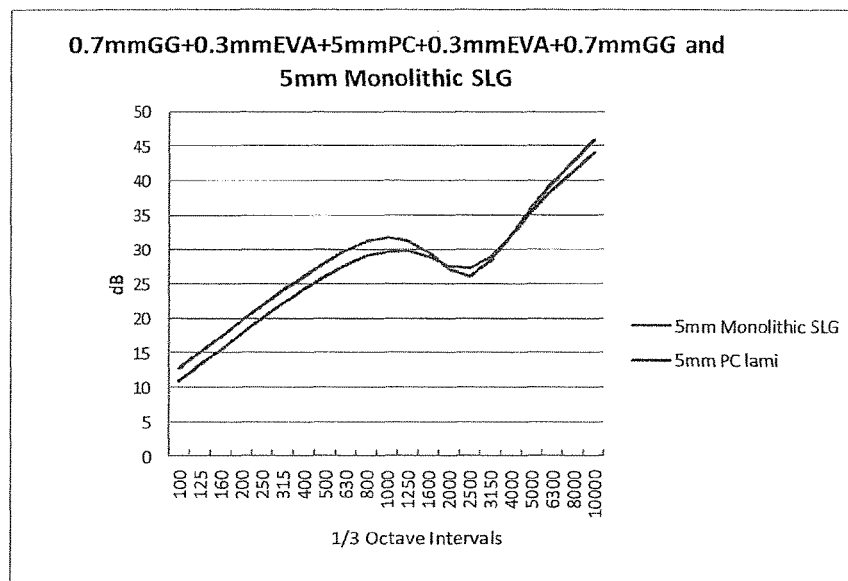
FIG. 8 is a plot comparing the acoustic performance of embodiments of the present disclosure with a monolithic soda lime glass structure.
Figure 9:
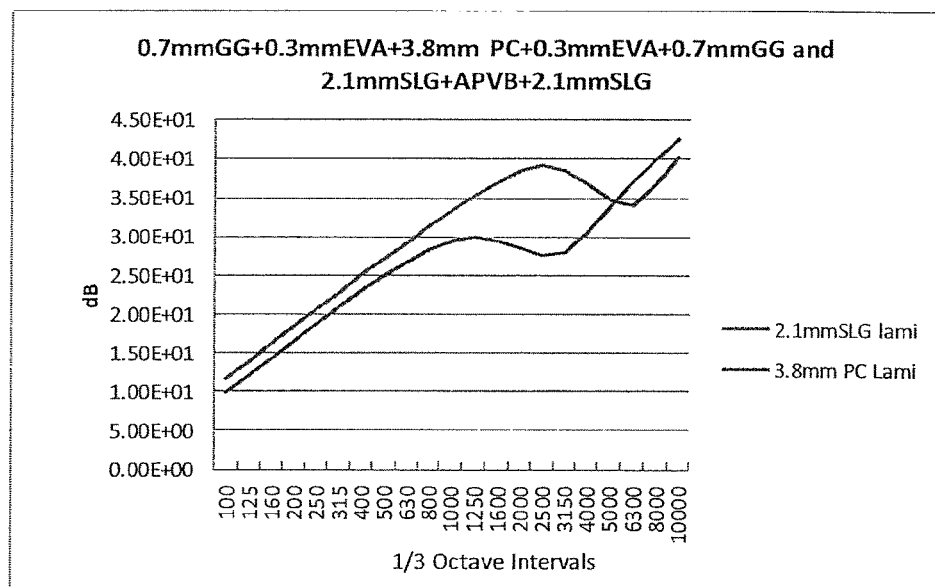
FIG. 9 is a plot comparing the acoustic performance of embodiments of the present disclosure with a soda lime glass laminate structure.

FIG. 8 is a plot comparing the acoustic performance of embodiments of the present disclosure with a monolithic soda lime glass structure. FIG. 9 is a plot comparing the acoustic performance of embodiments of the present disclosure with a soda lime glass laminate structure. With reference to FIG. 8, it can be observed that embodiments of the present disclosure having 0.7 mm thick chemically strengthened glass (e.g., Gorilla® Glass) with 0.3 mm EVA layers and a 5 mm rigid core of polycarbonate substantially correspond to the flexural properties of an approximately 5 mm thick monolithic soda lime glass structure while providing a 20% weight savings. Further, FIG. 8 illustrates comparable transmission losses between embodiments of the present disclosure and the monolithic soda lime glass structure; however, as expected the transmission loss is slightly less for embodiments of the present disclosure as these embodiments are 20% lighter than the 5 mm thick monolithic glass. It should be noted, however, that very little transmission loss difference was observed at the coincidence frequency and, in some cases, additional dampening with embodiments of the present disclosure was observed. With reference to FIG. 9, it can be observed that embodiments of the present disclosure having 0.7 mm thick chemically strengthened glass (e.g., Gorilla® Glass) with 0.3 mm EVA layers and a 3.8 mm rigid core of polycarbonate substantially correspond to the flexural properties of a conventional two ply soda lime glass laminate structure having two sheets of 2.1 mm soda lime glass with an intermediate acoustic PVB interlayer while providing a 30% weight savings. It can also be observed that transmission loss of embodiments of the present disclosure are about 2 dB less than that of the conventional two ply soda lime glass laminate due to the 30% weight savings of such embodiments. At the coincidence frequency of 2500 Hz, some embodiments can provided less transmission loss than the conventional 2.1 mm soda lime glass laminate structure due to the acoustic PVB in the soda lime glass laminate structure acting to reduce the depth of the coincidence dip and to shift it to higher frequencies. At frequencies above about 5000 Hz, transmission losses for embodiments of the present disclosure were about 3 dB greater than that of the soda lime glass laminate structure.

Figure 10:
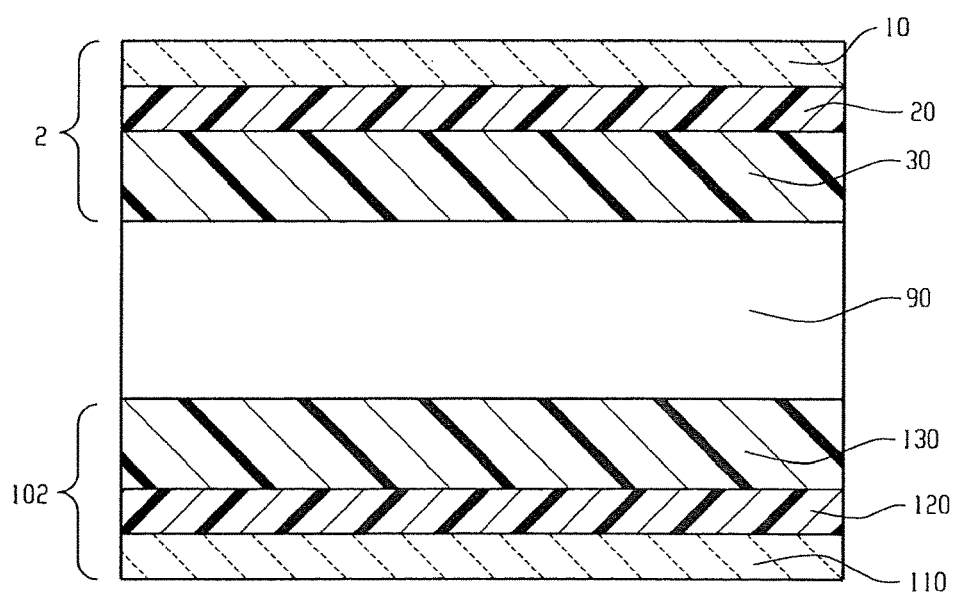
FIG. 10 is a cross-sectional illustration of an exemplary multi-pane multilayer article.

In some embodiments, an exemplary multilayer article can be a double pane article comprising a first and a second pane with a gap located there between as illustrated in FIG. 10. The double pane article can comprise at least one single sided multilayer or at least one dual sided multilayer pane. The second pane can be, for example, a single sided multilayer, a dual sided multilayer pane, a glass pane, or a polymer pane. The gap can be from about 4 to 25 mm, specifically, from about 6 to 20 mm, more specifically, from about 10 to 14 mm and all sub-ranges in between. The gap may be made to contain a liquid or gas such as Argon to improve insulation properties of the construction. It is also contemplated to decorate any and/or all layers and sides within this construction.

The double pane article depicted in FIG. 10 can comprise two single sided multilayers, where the polymer layers of each of the single sided multilayers can be in contact with a gap located in between the two panes. For example, FIG. 10 illustrates a double pane article comprising two single sided multilayers 2 and 102 with an intermediate gap 90. FIG. 10 illustrates a first glass layer 10 and first polymer layer 30 having an intermediate first interlayer 20 as well as a fourth glass layer 110 and second polymer layer 130 with an intermediate fourth interlayer 120. A gap 90 is illustrated intermediate the polymer layers 30 and 130. It is noted that one or more of glass layers 10 and 110 can comprise hardened glass. It is also contemplated to decorate any and/or all layers and sides within this construction.

Figure 11:
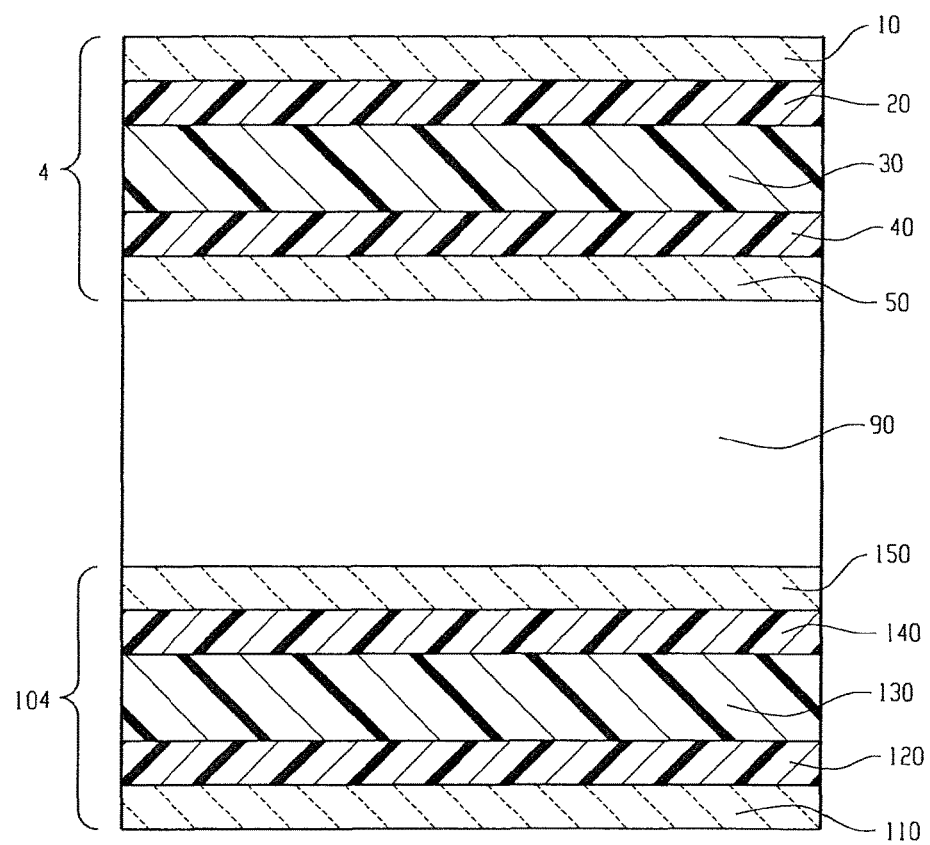
FIG. 11 is a cross-sectional illustration of another exemplary multi-pane multilayer article.

In other embodiments, the double pane article can comprise two dual sided multilayers with a gap located there between. For example, FIG. 11 illustrates a double pane article comprising two dual sided multilayers 4 and 104 comprising first polymer layer 30 and first polymer layer 130, respectively. The article includes a second glass layer 50 and third glass layer 150 are located next to a gap 90 with the first glass layer 10 and fourth glass layer 110 being the external surfaces of the double pane article. A first interlayer 20 and second interlayer 40 are intermediate the first polymer layer 30 and first glass layer 10 and intermediate the first polymer layer 30 and second glass layer 50, respectively. The fourth interlayer 120 and third interlayer 140 are intermediate the second polymer layer 130 and fourth glass layer 110 and intermediate the second polymer layer 130 and third glass layer 150, respectively. Of course, one or more of glass layers 10, 50, 150, and 110 can comprise hardened glass.

One or more decorative layers for a single pane or double pane article may also be applied to the polymer and/or glass layers by methods including but not limited to screen printing, laser marking, rotor gravure printing, pad printing, digital ink jet printing, hydrographics, laser etching, laser printing, and transfer printing. In some embodiments, the multilayer articles can be used in a confined or sealed area, such as, for example, the interior of an aircraft. For such applications, various flame retardant properties are of high importance. In the airline transportation industry, useful flame retardant properties, in particular, the heat release rate, of thermoplastic materials is typically measured and regulated according to Federal Aviation Regulations (FARs), in particular FAR 25.853 (d). The heat release rate standard described in FAR F25.4 (FAR Section 25, Appendix F, Part IV) is one such specified property, and thermoplastic materials conforming to this standard are required to have a 2 minute (min) integrated heat release rate of less than or equal to 65 kilowatt-minutes per square meter (kW-min/m$^2$) and a peak heat release rate of less than 65 kilowatts per square meter (kW/m$^2$) determined using the Ohio State University calorimeter, abbreviated as OSU 65/65 (2 min/peak). In some more stringent applications where a greater heat release rate performance is called for, a 2 minute integrated heat release rate of less than or equal to 55 kW-min/m$^2$ and a peak heat release rate of less than 55 kW/m$^2$ (abbreviated as OSU 55/55) can be required. In addition, for many applications, the thermoplastic materials need to have a smoke density ($D_s$) as described in FAR F25.5 (FAR Section 25, Appendix F, Part V) of less than 200, measured after 4 minutes in either flame or non-flame scenario, according to ASTM F814-83. In some embodiments, the multilayer articles can meet Bombardier SMP 800C and Boeing BSS 7239 for toxicity testing.

In some embodiments, the multilayer articles can meet the requirements of the Federal Railroad Administration (FRA) for ballistic threat and block threat. In some embodiments, the multilayer articles can pass the CFR 49, Chapter II, Federal Railroad Administration, DOT, Part 223, Subpart B, Appendix A, Type I, Ballistic Threat using caliber .22 LR (long rifle), 40.0-grain, lead ammunition with a minimum impact velocity of 960 feet per second (fps) fired at the center of the test sample. In some embodiments, the multilayer article can pass CFR 49, Chapter II, Federal Railroad Administration, DOT, Part 223, Subpart B, Appendix A, Type I, Block Threat using concrete blocks with a minimum weight of 25 pounds (lbs) suspended and then dropped 30 feet (9.14 meters (m)), 1 inch (2.54 centimeters (cm)) onto the center of the test sample.

In the transportation industry, useful flame retardant properties, in particular the heat release rate, of thermoplastic materials can be measured and regulated according to the European test standards EN45545 and ISO 5660. Accordingly, in some embodiments, the multilayer article can have a heat release according to EN45545 and ISO 5660 of less than 90 kilowatts (kW). In some embodiments, the multilayer article can have a fire propagation in accordance with the method shown in EN45545 and ISO 5658-2 of greater than 20 kW. In some embodiments, the multilayer article can have a smoke density in accordance with the method shown in EN 45545-2 and ISO 5659 for a smoke density at 240 seconds, where the multilayer article can have a smoke density of less than 300, and/or VOF$_4$, the article can have a the smoke density of less than 600. In some embodiments, the multilayer article can have a toxicity level in accordance with the method shown in ISO 5659-2 using FTIR for gas analysis as required by EN45545-2 Annex C (50 kW) where the multilayer article can have a toxicity level with a CITG of less than 0.9 for an HL2 rating or less than 1.2 for an HL1 rating.

In the transportation industry, useful flame retardant properties, in particular the flame spread and fire propagation, of thermoplastic materials can be measured and regulated according to the British test standards BS476 Part 7 and Part 6, respectively. Accordingly, in some embodiments, the multilayer article can have a flame spread of less than or equal to 165 mm according to BS476 Part 7. In some embodiments, the multilayer article can have a fire propagation of less than or equal to 12 according to BS476 Part 6.

In the transportation industry, useful flame retardant properties, in particular the smoke development and toxicity of the gases from a fire, of thermoplastic materials can be measured and regulated according to the British test standards BS 6853:1999 Annex D8.4 Panel Smoke test and Annex B.2 Toxicity test, respectively. Accordingly, in some embodiments, the multilayer article can have an Ao (On) of less than 2.6 and an Ao (off) of less than 3.9 according to BS 6853:1999 Annex D8.4. In some embodiments, the multilayer article can have a toxicity of less than 1 according to BS 6853:1999 Annex B.2.

Exemplary multilayer articles can be opaque. Exemplary multilayer articles can also have excellent transparency. For example, the multilayer article can have a haze of less than 10% and a transmission greater than 70%, each measured using the color space CIE1931 (Illuminant C and a 2° observer), or according to ASTM D 1003 (2007) using illuminant C at a 0.125 inch (3.2 mm) thickness.

In some embodiments, a 1,467 mm by 1,215 mm test sample can have a maximum deflection of less than or equal to 5 mm when subjected to an applied load of 2,500 Newtons per meter squared (N/m$^2$). In other embodiments, a 1,512 mm by 842 mm test sample can have a maximum deflection of less than or equal to 5 mm when subjected to an applied load of 6,000 N/m$^2$.

In further embodiments, at least one of the glass layers comprises a hardened glass sheet. As noted above and discussed with reference to FIG. 1, the hardened glass sheet can be prepared by placing a glass sheet in a solution comprising a replacement ion and exchanging sodium ions present in the glass sheet with the replacement ion. The glass sheet can comprise sodium oxide plus an oxide of silicon, calcium, aluminum, magnesium, boron, barium, lanthanum, cerium, lead, germanium, or a combination comprising one or more of the foregoing. The glass sheet can comprise sodium oxide plus an oxide of silicon, calcium, aluminum, boron, or a combination comprising one or more of the foregoing. The glass sheet can be, for example, a sodium aluminosilicate or a sodium aluminoborosilicate glass. In an exemplary ion exchanging process, the replacement ion can be an ion with a larger atomic radius than sodium, for example, a potassium ion, a rubidium ion, a cesium ion, or a combination comprising one or more of the foregoing. The replacement ion can be present in the solution as sulfates, halides, and the like. The solution can comprise $KNO_3$, specifically, the solution can consist of molten $KNO_3$. The replacing can occur at a temperature of 400 to 500 degrees Celsius (° C.). The glass sheet can be in the solution for 4 to 24 hours, specifically, 6 to 10 hours. In some embodiments, an exemplary ion exchange process can produce: (i) an iCS at the surface of the hardened glass sheet, (ii) an iDOL into the hardened glass sheet, and (iii) an iCT within the hardened glass sheet. Of course, after replacement of the ions, the hardened sheet can be subjected to one or both of an acid etching step and an annealing step as described above. The acid etching step can comprise introducing the hardened glass to an acid solution. The acid can comprise hydrofluoric acid, hydrochloric acid, nitric acid, sulfuric acid, ammonium bifluoride, sodium bifluoride, or a combination comprising one or more of the foregoing. The acid etching step can remove less than or equal to 4 micrometers, specifically, less than or equal to 2 micrometers, more specifically, less than or equal to 1 micrometer of the surface glass. In the annealing step, the hardened glass sheet can be subjected to an elevated temperature, for example, of 400 to 500° C. The annealing step can occur in air or in an inert environment. The annealing step can occur for 4 to 24 hours, specifically, 6 to 10 hours to reduce the iCS to an fCS. The fCS can be less than or equal to 400 MPa, specifically, less than or equal to 350 MPa, more specifically, less than or equal to 300 MPa. The fCS can also be 200 to 400 MPa, specifically, 250 to 350 MPa. The annealing step can increase the iDOL to a fDOL greater than or equal to 60 micrometers, specifically, greater than or equal to 80 micrometers, more specifically, greater than or equal to 90 micrometers, even more specifically, greater than or equal to 100 micrometers. Again, the annealing step can reduce the iCT to an fCT below the chosen frangibility limit of the glass sheet.

An exemplary hardened glass layer can have a surface compressive stress of 400 to 900 MPa and a depth of layer of compressive stress of greater than or equal to 30 micrometers. Specifically, the hardened glass can have a surface compressive stress of 250 to 350 MPa with a depth of layer of compressive stress of greater than or equal to 60 micrometers.

The glass layer can be 0.5 to 1.5 millimeters (mm), specifically, 0.55 to 0.7 mm or 0.8 to 1 mm. If more than one glass layer is present, each glass layer individually can be 0.5 to 1.5 mm, specifically, 0.55 to 0.7 mm or 0.8 to 1 mm. Additionally, the glass layer can provide improved resistance to scratching. For example, using a Vicker's indentor on a hardened glass, a load of 3,000 to 7,000 grams is needed to cause damage to the glass. As compared to a standard safety glass, a load of only 1,000 grams is enough to cause damage to the safety glass.

In some embodiments, the interlayer can be a layer that allows the polymer layer and the glass layer to adhere to each other. The interlayer can comprise a thermoplastic urethane (TPU), a poly(ethylene-co-vinyl acetate) (EVA), or a combination comprising one or both of the foregoing. The interlayer can comprise EVA.

The TPU can comprise long polyol chains that are tied together by shorter hard segments formed by the diisocyanate and chain extenders if present. Polyol chains are typically referred to as soft segments, which impart low-temperature flexibility and room-temperature elastomeric properties. Generally, the higher the soft segment concentration, the lower will be the modulus, tensile strength, hardness, while elongation will increase. Polyols for use as tie-layers in the multilayer article of the present invention can be generally broken into three categories: 1) polyether polyols, 2) polyester polyols, and 3) polyols based on polybutadiene. In one embodiment of the invention, tie-layers comprising polyols having polyether backbones are found to have excellent hydrolytic stability especially desired for automotive applications.

The EVA can have a vinyl acetate content of 20 to 80 wt %, specifically, 20 to 50 wt %, more specifically, 25 to 35 wt % based on the total weight of the EVA. The EVA can comprise maleic anhydride functionalized EVA copolymers. The EVA can be free of hindered amine light stabilizers (HALS) so that it will not attack the polycarbonate. As used herein, EVA that is free of hindered amine light stabilizers means that the EVA has less than or equal to 0.1 wt %, specifically, 0 to 0.01 wt % of hindered amine light stabilizers based on the total weight of the interlayer.

Examples of hindered amine light stabilizers that the interlayer can be free of include 4-piperidinol derivative having the general formula (2):

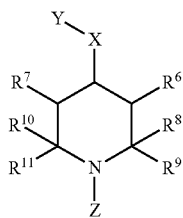

(2)

wherein X is oxygen, and Y is hydrogen, hydroxyalkyl, aminoalkyl, or $C_{1-20}$ alkyl substituted by both hydroxyl and amino groups. $R^6$ and $R^7$ are each independently selected from the group consisting of a hydrogen atom, an alkyl group, an alkenyl group, or an arylalkyl group. For example, $R^6$ and $R^7$ can each be hydrogen. $R^8$, $R^9$, $R^{10}$, and $R^{11}$ can each independently be selected from the group consisting of a $C_{1-6}$ alkyl group, phenyl, an arylalkyl group, a $C_{5-6}$ aromatic heterocyclic group, and containing an oxygen, sulfur or nitrogen atom, or $R^8$, $R^9$, $R^{10}$, and $R^{11}$ respectively, together or with the carbon atom to which they are attached can represent a $C_{5-12}$ cycloalkyl group. $R^8$, $R^9$, $R^{10}$, and $R^{11}$ can be methyl. Z is an oxy radical, an alkyl group, an alkenyl group, an alkoxyalkyl group, an arylalkyl group that is unsubstituted or which has one or more substituents in its aryl moiety, including, for example, 2,3-epoxypropyl. Z can be represented by the formula —$CH_2COOR^{12}$, wherein $R^{12}$ is an alkyl group, an alkenyl group, a phenyl group, an aryfalkyl group, or a cyclohexyl group. Z can have the formula —$CH_2CH(R^{14})OR^{13}$, wherein $R^{14}$ is a hydrogen atom, a methyl group or a phenyl group and $R^{13}$ is a hydrogen atom, an alkyl group, an ester, a carbonyl, an acyl group, an aliphatic acyl group, or a group represented by the formula —$COOR^{15}$, or —$OOCR^{15}$, wherein $R^{15}$ is an alkyl group, a benzyl group, a phenyl group, and the like.

Commercially available examples of HALS are TINUVIN™ 622 (Ciba Specialty Chemicals, Inc., Basel Switzerland), TINUVIN™ 770 (Ciba Specialty Chemicals, Inc., Basel Switzerland), CYASORB™ UV-3529 (Cytec), CYASORB™ UV-3631 (Cytec) CYASORB™ UV-3346 (Cytec), CYASORB™ UV-4593 (Cytec), UVINUL™ 5050H (BASF), and SANDUVOR™ 3058 (Clariant).

The interlayer can be 0.2 to 1.4 mm, specifically, 0.2 to 0.7 mm, specifically, 0.3 to 0.6 mm, more specifically, 0.35 to 0.5 mm. The polymer layer can comprise a polymer composition that can comprise a polysiloxane, a polyester, a polycarbonate, a copolymer comprising one or more of the foregoing, or a blend comprising one or more of the foregoing. The polymer layer can comprise a polycarbonate. The polycarbonate can be polymerized by, for example, in an interfacial process. Although the reaction conditions for interfacial polymerization can vary, an exemplary process generally involves dissolving or dispersing a dihydric phenol reactant in an aqueous base, adding the resulting mixture to a water-immiscible solvent medium, and contacting the reactants with a carbonate precursor in the presence of a catalyst such as, for example, triethylamine or a phase transfer catalyst, under controlled pH conditions, e.g., 8 to 11. The water immiscible solvent can include one or more of methylene chloride, 1,2-dichloroethane, chlorobenzene, toluene, and the like. Generally, a chelant, such as an iron scavenger, can be used as well to remove impurities and contaminants.

Exemplary carbonate precursors include, for example, a carbonyl halide such as carbonyl bromide or carbonyl chloride, or a haloformate such as a bishaloformates of a dihydric phenol (e.g., the bischloroformates of bisphenol-A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. An interfacial polymerization reaction to form carbonate linkages uses phosgene as a carbonate precursor, and can be referred to as a phosgenation reaction.

Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, triethylamine or a phase transfer catalyst, under controlled pH conditions, e.g., 8 to 11. The most commonly used water immiscible solvents include methylene chloride, 1,2-dichloroethane, chlorobenzene, toluene, and the like.

Among the phase transfer catalysts that can be used are catalysts of the formula $(R_3)_4Q+X$, wherein each $R_3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)6]_4NX$, $[CH_3(CH_2)_4]_4NX$, $CH_3[CH_3(CH_2)_3]_3NX$, and $CH_3[CH_3(CH_2)_2]_3NX$, wherein X is Cl⁻, Br⁻, a $C_{1-8}$ alkoxy group or a $C_{6-18}$ aryloxy group. An effective amount of a phase transfer catalyst can be 0.1 to 10 wt % based on the weight of bisphenol in the phosgenation mixture. An effective amount of phase transfer catalyst can be 0.5 to 2 wt % based on the weight of bisphenol in the phosgenation mixture. The dihydric phenol reactant can be of very high purity and very low color, e.g., it can be at least 99.80% pure.

A common polymerization process uses bisphenol-A (BPA) for the dihydric phenol reactant, aqueous sodium hydroxide (NaOH), and phosgene as the carbonate precursor. BPA can be produced in two grades, polycarbonate grade and epoxy grade. Polycarbonate grade BPA is higher purity and has a lower color, as measured by APHA at 325 nm. Generally, high purity BPA has a measured APHA of less than 10 while lower purity, epoxy grade BPA has an APHA of greater than 40. The BPA used to form the polycarbonate resins of the present disclosure can have a purity of greater than or equal to 99.65%, specifically, greater than or equal to 99.80%. The organic purity can be defined as 100 wt % minus the sum of known and unknown impurities detected using ultraviolet (UV) (see HPLC method in Nowakowska et al., Polish J. Appl. Chem., XI(3), 247-254 (1996)). Such high quality bisphenol-A is commercially available. The BPA for polycarbonates can be the para,para isomer of BPA. The BPA can have a sulfur level of less than or equal to 4 parts per million by weight (ppm), specifically, less than or equal to 2 ppm, even more specifically, less than or equal to 1.5 ppm as measured by a commercially available Total Sulfur Analysis based on combustion and coulometric detection.

Methylene chloride can be used as a solvent to form the polycarbonate. The methylene chloride can be purified by steam precipitation to leave contaminants behind. For example, the methylene chloride can contain less than 10 ppm of calcium, less than 1 ppm of iron, less than 0.5% salt, and/or less than 0.1% degraded polymer. The aqueous base can be aqueous sodium hydroxide (NaOH). NaOH can be used to maintain the reaction pH within a typical range of 9.5 to 10.0, and to neutralize the HCl formed from the reaction of BPA with phosgene (turning the water into brine). NaOH can be made by the electrolysis of sodium chloride. One impurity formed in the electrolysis and present in the NaOH is sodium chlorate ($NaClO_3$). The amount of $NaClO_3$ can be reduced by reacting the NaOH stream with hydrogen using a ruthenium catalyst supported on carbon. However, it is not possible to guarantee that all the $NaClO_3$ present is reacted, so some will always remain in the treated NaOH solution. $NaClO_3$ is an oxidant and has been demonstrated to react with BPA. While the reaction products of $NaClO_3$ with BPA have not been completely characterized, it is believed that the oxidation of the phenol group of BPA causes the formation of quinone structures, which are typically highly colored. It has been demonstrated that producing polycarbonate resin using NaOH with high levels of $NaClO_3$ results in a resin that when molded is high in color and has poor color stability. The NaOH used in the present disclosure can contain less than 10 ppm of $NaClO_3$. Additionally, solid particulates can be removed from the NaOH solution by filtration using 10 micron absolute media.

High quality phosgene can be used in the polymerization of the polycarbonate. Phosgene can be produced by the reaction of carbon monoxide and chlorine. This reaction is typically run with an excess of carbon monoxide, which is inert in the interfacial polymerization. However, small amounts of un-reacted chlorine can be present in the phosgene. Chlorine can react with NaOH in the interfacial polymerization reaction to produce sodium hypochlorite (NaClO) which can react with BPA in a manner similar to $NaClO_3$. The chlorine can also react directly with BPA. Chlorine reaction with BPA can result in chlorination of the polymer backbone. Polycarbonate produced when free chlorine levels in the phosgene are greater than 500 ppm can result in polycarbonate resin that can have greater than 200 ppm bound chlorine atoms. This resin can have increased yellowness and decreased color stability. The level of incorporated chlorine atoms in the polycarbonate resin can be less than 20 ppm when phosgene containing less than 100 ppm free chlorine is used. Thus, it is important to control the amount of chlorine introduced via phosgene.

The reaction of phosgene with BPA to produce the polycarbonate powder can be run with phosgene to ensure complete molecular weight build and minimize the amount of residual, un-reacted BPA monomer. Generally, 8 to 10 mole % excess phosgene is adequate. When less than 8 mole % excess phosgene is used, there is a greater risk of incomplete batch events that result in the polymer having a weight average molecular weight (Mw) that is lower than desired, having higher that desired OH end group levels, and a risk of elevated residual monomer. Generally, there can be less than 50 ppm of hydroxyl end groups in the polycarbonate and less than 50 ppm residual BPA monomer in the polycarbonate.

The weight average molecular weight (Mw) of the polycarbonate powder can be controlled by adding a chain stopping or endcapping agent. Exemplary endcapping agents include phenol, para-t-butylphenol, and p-cumyl phenol (PCP). The amount of endcapping agent can be 2.25 to 5.5 mole % and can result in a Mw of 36,000 to 17,000 grams per mole (g/mol) as determined by gel permeation chromatography (GPC) using polycarbonate standards. More commonly, the amount of endcapping agent can be 2.9 to 4.3 mole percent (mol %) and can result in a Mw of 30,000 to 21,000 g/mol. An endcapping agent can be employed in the reaction such that the resultant composition comprising polycarbonate comprises a free hydroxyl level less than or equal to 150 ppm, more specifically, of 25 to 150 ppm, even more specifically, 30 to 100 ppm.

The post reaction processing of the polycarbonate can be important in producing a low color and color stable polycarbonate resin. The reaction mixture, containing polycarbonate, brine, water immiscible solvent, and impurities, can be considered to be a batch. The batch can be discharged and purified through a series of purifying stages. Each stage can be made up, for example, of one or more liquid-liquid centrifuges.

In a first purifying stage, the brine phase can be separated from the methylene chloride phase that contains dissolved polycarbonate. In a second purifying stage, the catalyst can be extracted from the methylene chloride phase. This can be done using dilute aqueous hydrochloric acid. In a third purifying stage, residual ionic species can be removed by washing the methylene chloride phase using high quality water. High quality water has generally been condensed from steam or has been purified using de-ionization, such that few contaminants are present in the water. For example, the conductivity of the high quality water can be less than 10 micro-siemens per centimeter (micro-siemens/cm). As a result, the polycarbonate can have low residual chloride ions. It has been shown that when water containing mineral and metal impurities such as calcium, silicate, iron, sulfate or the like is used, molded parts made from the subsequent polycarbonate resin can have increased haze and yellowness.

After purification, the non-aqueous phase containing the dissolved polycarbonate can be optionally filtered using 1 to 10 micrometer absolute filters. The polycarbonate can then be concentrated and isolated by means of steam precipitation, which instantly flashes the dichloromethane solvent during direct contact with steam. The steam used for precipitation can be very low in mineral and ion content, preferably with a conductivity value of less than one micro-siemens/cm. The steam used for isolation, can optionally be filtered using 1 to 50 micron absolute filters. Precipitation of resin using steam with high mineral or ion content (greater than 10 micro-siemens/cm) can result in high yellowness and poor melt stability for the polycarbonate resin.

The dichloromethane and steam vapors can be separated from the wet polycarbonate. The dichloromethane and steam vapors can themselves be condensed and separated. The recovered dichloromethane can be high purity by virtue of being flashed, and can be reused in future polymerization of BPA. The recovered water can also be high purity, and can be used in the purifying stages for washing or the extraction of catalyst. The recovered catalyst/water mixture can be reused in future polymerization of BPA.

Residual dichloromethane can be removed from the wet polycarbonate in a plug flow column using counter current steam flow. Residual water can be removed from the wet polycarbonate in a fluid bed dryer using heated air. The resulting polycarbonate powder can then be collected.

To summarize, a number of steps can be taken to produce high quality polycarbonate. High purity BPA that is low color and especially color stable can be used. The NaOH base can be low in sodium chlorate content and can be filtered. The phosgene can be low in non-reacted chlorine content. Conservative reaction conditions that ensure complete polymerization can be used. High purity water should be used during the purifying stages of obtaining the polycarbonate.

Next, the compounding processes that form the polycarbonate resin can be optimized as well. Initially, the high quality polycarbonate, which has been made can be isolated and segregated to designated silos in the compounding operation. Each silo can be cleaned of any residual powder to ensure there is no cross-contamination. The transfer lines used to move polycarbonate powder from the silos to the extrusion line can also be cleaned out prior to transferring. Filtered air can be used for transferring. Any additives (colorants, stabilizers, etc.) can be metered directly into the extruder using dedicated feeders.

The compounding of the polycarbonate powder can be performed in an extruder. An extruder can be used for compounding, molding, pelletization or forming films, sheets or profiles. Such extruders typically have a heated extrusion barrel and one or two screws revolving within the barrel to compress, melt, and extrude the polycarbonate through an orifice in an extrusion nozzle. The barrel can be divided into several different zones, such as feed, transition, mixing, dispersion, and metering zones.

The polycarbonate, along with additives, can be melt extruded at a controlled temperature. 58 mm or 70 mm extruders can be typically used for high-grade polycarbonate resins. The polycarbonate can be melt filtered through a 30 micrometer filter stack to reduce particulate contamination. It is possible to use a smaller mesh filter (10 micrometer) to further improve the quality of the product. Stainless steel water baths with 0.5 micrometer-filtered water can be used to minimize contamination. Polycarbonate resin exiting the extruder can be pelletized and collected in packaging such as bulk boxes or super sacks. Care can be taken during the extrusion and packaging processes to exclude particulates that can be present in air and water transfer systems.

In this respect, two aspects of the compounding process can be relevant to obtaining the high quality polycarbonate resins of the present disclosure. First, as the melt filter sizes get smaller, shear forces and heat can increase as the polycarbonate passes through the filter channels. This can result in an increase in yellowness in the resulting polycarbonate. Second, an amount of blue colorant can be added to the polycarbonate to offset any yellowness. Once the extruder has reached stable operating state and pellets are being produced, a small sample of pellets can be molded into a color plaque at a specified thickness. Color measurements can be recorded and compared to the desired specifications of the product. The amount of colorant or their strength can then be adjusted to bring the polycarbonate product within specifications. Again, by controlling the yellowness of the polycarbonate, the amount of colorant needed to meet the colorant specification (b*) can be reduced, which increases the brightness (L*).

To obtain the high quality polycarbonate having increased light transmission and cleanliness, the feed rate to the extruder, the torque of the extruder, the set point for the colorant, and the temperature of the extruder can be optimized. This can be done using a feedback loop to obtain the desired product. The colorant is typically measured as a percentage of the line rate. The torque can be 70% to 90%.

In certain cases in compounding polyester carbonates, along with its additives, it can be beneficial to use extruders designed to minimize shear heating and black speck generation. For example, a co-rotating intermeshing twin screw extruder with mild screw designs and with mild extrusion conditions is preferred. Co-rotating intermeshing extruders have the advantage of self-wiping screw elements thus minimizing black speck generation. Mild screws designs are known in the art and typically minimize the number of high shear mixing elements such as wide to medium wide kneading blocks, and/or left handed kneading blocks (utilizing two or three lobe elements) to achieve melting and use low shear mixing elements such as ZMEs (Zahn Mixing Elements), TMEs (Turbine Mixing Elements), and/or SMEs (Screw Mixing Elements) for good distributive mixing of any additives/colorants. Single screw extruders can provide low shear melting and mixing but have the disadvantage of higher black speck generation because it lacks self-wiping capabilities.

In addition to the use of low shear extruders, for the lowest color, highest transmission resin, it can also be beneficial to use mild extrusion conditions. These conditions are known in the art and typically minimized the specific energy and/or maximize the torque. The feed rate to the extruder, the screw speed, the colorant concentration, and the temperature of the extruder can be optimized to minimize the specific energy, maximize the torque and optimize the color and transmission.

To obtain high optical quality polyester carbonate resin and articles, it is often advantageous to exclude the contamination of non-miscible resins. Non-miscible haze cause resins could include for example, BPA polycarbonate. A "polycarbonate" means compositions having repeating structural carbonate units of formula (1):

in which at least 60% of the total number of $R^1$ groups contain aromatic moieties and the balance thereof are aliphatic, alicyclic, or aromatic.

The polycarbonate can be derived from bisphenol-A. Each $R^1$ group can be a divalent aromatic group, for example, derived from an aromatic dihydroxy compound of the formula (3):

wherein each of $A^1$ and $A^2$ is a monocyclic divalent arylene group, and $Y^1$ is a single bond or a bridging group having one or two atoms that separate $A^1$ from $A^2$. When each of $A^1$ and $A^2$ is phenylene, $Y^1$ can be para to each of the hydroxyl groups on the phenylenes. Illustrative non-limiting examples of groups of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ can be a hydrocarbon group or a saturated hydrocarbon group such as methylene, cyclohexylidene, or isopropylidene. In an embodiment, one atom separates $A^1$ from $A^2$.

Included within the scope of formula (3) are bisphenol compounds of general formula (4):

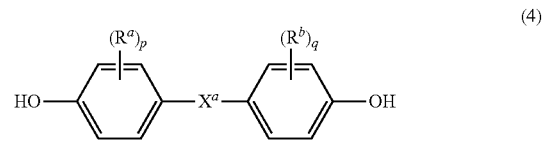

wherein $R^a$ and $R^b$ each represent a halogen atom or a monovalent hydrocarbon group and can be the same or different; p and q are each independently integers of 0 to 4; and $X^a$ represents a single bond or one of the groups of formulas (5) or (6):

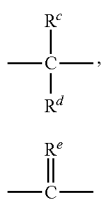

(5)

(6)

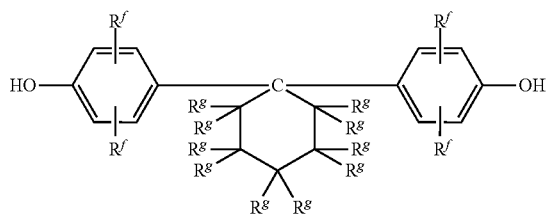

(8)

wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group. $R^c$ and $R^d$ can each be the same hydrogen or $C_{1-4}$ alkyl group, specifically, the same $C_{1-3}$ alkyl group, even more specifically, methyl.

$R^c$ and $R^d$ can be taken together to represent a $C_{3-20}$ cyclic alkylene group or a heteroatom-containing $C_{3-20}$ cyclic alkylene group comprising carbon atoms and heteroatoms with a valency of two or greater. These groups can be in the form of a single saturated or unsaturated ring, or a fused polycyclic ring system wherein the fused rings are saturated, unsaturated, or aromatic. A specific heteroatom-containing cyclic alkylene group comprises at least one heteroatom with a valency of 2 or greater, and at least two carbon atoms. Exemplary heteroatoms in the heteroatom-containing cyclic alkylene group include —O—, —S—, and —N(Z)—, where Z is a substituent group selected from hydrogen, hydroxy, $C_{1-12}$ alkyl, $C_{1-12}$ alkoxy, or $C_{1-12}$ acyl.

$X^a$ can be a substituted $C_{3-18}$ cycloalkylidene of the formula (7):

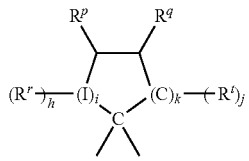

(7)

wherein each $R^r$, $R^p$, $R^q$, and $R^t$ is independently hydrogen, halogen, oxygen, or $C_{1-12}$ organic group; I is a direct bond, a carbon, or a divalent oxygen, sulfur, or —N(Z)— wherein Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (7) will have an unsaturated carbon-carbon linkage where the ring is fused. When k is 1 and i is 0, the ring as shown in formula (7) contains 4 carbon atoms, when k is 2, the ring as shown contains 5 carbon atoms, and when k is 3, the ring contains 6 carbon atoms. Two adjacent groups (e.g., $R^q$ and $R^t$ taken together) can be taken together to form an aromatic group. Further, multiple groups can be taken together to form greater than one aromatic groups (e.g. $R^q$ and $R^t$ taken together form one aromatic group and $R^r$ and $R^p$ taken together form a second aromatic group).

When k is 3 and i is 0, bisphenols containing substituted or unsubstituted cyclohexane units are used, for example, bisphenols of formula (8):

wherein each $R^f$ is independently hydrogen, $C_{1-12}$ alkyl, or halogen; and each $R^g$ is independently hydrogen or $C_{1-12}$ alkyl. The substituents can be aliphatic or aromatic, straight chain, cyclic, bicyclic, branched, saturated, or unsaturated. Such cyclohexane-containing bisphenols, for example, the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination comprising at least one of the foregoing with other bisphenol polycarbonates, are supplied by Bayer Co. under the APEC* trade name.

Other possible dihydroxy compounds having the formula HO—$R^1$—OH include aromatic dihydroxy compounds of formula (9):

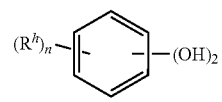

(9)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen can be bromine.

Some illustrative examples of dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantine, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9 to bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds that can be represented by formula (3) include 1,1-bis(4-hydroxyphenyl)methane, 1,1-bis(4-hydroxyphenyl)ethane, 2,2-bis(4-hydroxyphenyl)propane (hereinafter "bisphenol-A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds can also be used.

"Polycarbonate" as used herein includes homopolycarbonates, copolymers comprising different $R^1$ moieties in the carbonate (referred to herein as "copolycarbonates"), and copolymers comprising carbonate units and other types of polymer units, such as ester units. The polycarbonate can be a linear homopolymer or copolymer comprising units derived from bisphenol-A, in which each of $A^1$ and $A^2$ is p-phenylene and $Y^1$ is isopropylidene in formula (3). More specifically, at least 60%, more specifically, at least 80% of the $R^1$ groups in the polycarbonate can be derived from bisphenol-A.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride (TMTC), tris-p-hydroxy phenyl ethane (THPE), 3,3-bis-(4-hydroxyphenyl)-oxindole (also known as isatin-bis-phenol), tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl)phenol), 4-chloroformyl phthalic anhydride, trimesic acid, and benzophenone tetracarboxylic acid. The branching agents can be added at a level of 0.05 to 2.0 wt %. Mixtures comprising linear polycarbonates and branched polycarbonates can be used.

A particular type of branching agent can be used to create branched polycarbonate materials. These branched polycarbonate materials have statistically more than two end groups. The branching agent is added in an amount (relative to the bisphenol monomer) that is sufficient to achieve the desired branching content, that is, more than two end groups. The molecular weight of the polymer can become very high upon addition of the branching agent and can lead to viscosity problems during phosgenation. Therefore, an increase in the amount of the chain termination agent can be used in the polymerization. The amount of chain termination agent used when the particular branching agent is used is generally higher than if only a chain termination agent alone is used. The amount of chain termination agent used is generally above 5 mol % and less than 20 mol % compared to the bisphenol monomer.

The branching agent can be a structure derived from a triacid trichloride of the formula (21):

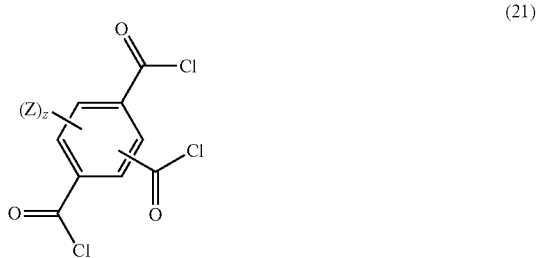

wherein Z is hydrogen, a halogen, $C_{1-3}$ alkyl group, $C_{1-3}$ alkoxy group, $C_{7-12}$ arylalkyl, alkylaryl, or nitro group, and z is 0 to 3; or a branching agent derived from a reaction with a tri-substituted phenol of the formula (22):

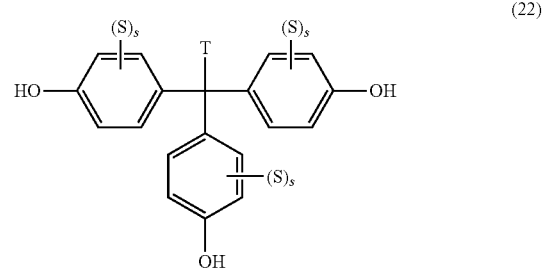

wherein T is a $C_{1-20}$ alkyl group, $C_{1-20}$ alkyleneoxy group, $C_{7-12}$ arylalkyl, or alkylaryl group, S is hydrogen, a halogen, $C_{1-3}$ alkyl group, $C_{1-3}$ alkoxy group, $C_{7-12}$ arylalkyl, alkylaryl, or nitro group, s is 0 to 4.

In another embodiment, the branching agent is a structure having formula (23):

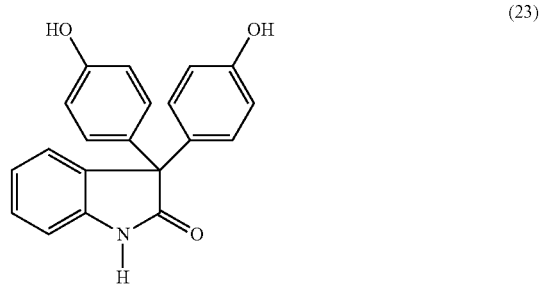 [SMILES: O=C1Nc2ccccc2C1(c1ccc(O)cc1)c1ccc(O)cc1]

Examples of specific branching agents that are particularly effective in embodiments include trimellitic trichloride (TMTC), tris-p-hydroxy phenyl ethane (THPE) and isatin-bis-phenol. In formula (21), Z can be hydrogen and z can be 3. In formula (22), S can be hydrogen, T can be methyl, and s can be 4.

The relative amount of branching agents used in the manufacture of a polymer according to embodiments will depend on a number of considerations, for example, the type of $R^1$ groups, the amount of cyanophenol, and the desired molecular weight of the polycarbonate. In general, the amount of branching agent is effective to provide 0.1 to 10 branching units per 100 $R^1$ units, specifically, 0.5 to 8 branching units per 100 $R^1$ units, and more specifically, 0.75 to 5 branching units per 100 $R^1$ units. For branching agents having formula (21), the amount of branching agent tri-ester groups are present in an amount of 0.1 to 10 branching units per 100 $R^1$ units, specifically, 0.5 to 8 branching units per 100 $R^1$ units, and more specifically, 0.75 to 5 tri-ester units per 100 $R^1$ units. For branching agents having formula (22), the amount of branching agent tricarbonate groups are present in an amount of 0.1 to 10 branching units per 100 $R^1$ units, specifically, 0.5 to 8 branching units per 100 $R^1$ units, and more specifically, 0.75 to 5 tri-phenylcarbonate units per 100 $R^1$ units. In some embodiments, a combination of two or more branching agents can be used. In one embodiment, the polycarbonate of a composition has a branching level of greater than or equal to 1%, or greater than or equal to 2%, or greater than or equal to 3%, or 1% to 3%.

Various types of end-capping agents can be utilized for embodiments encompassed by this disclosure. The end-capping agent can be selected based upon the molecular weight of said polycarbonate and said branching level imparted by said branching agent. The end-capping agents can be selected from at least one of the following: phenol or a phenol containing one or more substitutions with at least one of the following: aliphatic groups, olefinic groups, aromatic groups, halogens, ester groups, and ether groups. The end-capping agents can be selected from at least one of the following: phenol, para-t-butylphenol or para-cumylphenol.

The polycarbonate encompassed by this disclosure can exclude the utilization of a melt polymerization process to make at least one of said polycarbonates. Protocols can be adjusted so as to obtain a desired product within the scope of the disclosure and this can be done without undue experimentation. In some embodiments, the polymer composition can comprise a polyester. The polyester contains repeating units of formula (10):

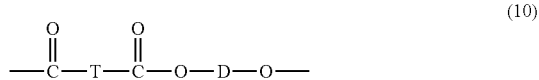

(10)

wherein D is a divalent group derived from a dihydroxy compound, and can be, for example, a $C_{2-10}$ alkylene group, a $C_{6-20}$ alicyclic group, a $C_{6-20}$ aromatic group or a polyoxyalkylene group in which the alkylene groups contain 2 to 6 carbon atoms, specifically, 2, 3, or 4 carbon atoms; and T is a divalent group derived from a dicarboxylic acid, and can be, for example, a $C_{2-10}$ alkylene group, a $C_{6-20}$ alicyclic group, a $C_{6-20}$ alkyl aromatic group, or a $C_{6-20}$ aromatic group. D can be a $C_{2-30}$ alkylene group having a straight chain, branched chain, or cyclic (including polycyclic) structure. D can be derived from an aromatic dihydroxy compound of formula (4) above and/or D can be derived from an aromatic dihydroxy compound of formula (9) above.

Examples of aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is 91:9 to 2:98. D can be a $C_{2-6}$ alkylene group and T can be p-phenylene, m-phenylene, naphthalene, a divalent cycloaliphatic group, or a combination thereof. This class of polyester includes the poly(alkylene terephthalates).

The polyester can also comprise arylate ester units of the arylate-containing units and are derived from the reaction product of one equivalent of an isophthalic acid derivative and/or terephthalic acid derivative. An arylate unit is illustrated in formula (9):

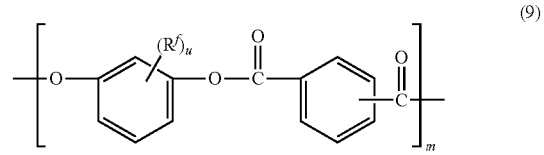

(9)

wherein $R^f$ and u are previously defined for formula (7), and m is greater than or equal to 4. In an embodiment, m is 4 to 50, specifically, 5 to 30, more specifically, 5 to 25, and still more specifically, 10 to 20. Also in an embodiment, m is less than or equal to 100, specifically, less than or equal to 90, more specifically, less than or equal to 70, and still more specifically, less than or equal to 50. It will be understood that the low and high endpoint values for m are independently combinable. In another embodiment, the molar ratio of isophthalate to terephthalate can be about 0.25:1 to about 4.0:1. In a specific embodiment, the arylate ester units consist of isophthalate-terephthalate ester units. In another embodiment, the arylate ester units are derived from the reaction product of one equivalent of an isophthalic acid derivative and/or a terephthalic acid derivative with a resorcinol of formula (7). Such arylate ester units correspond to the $R^1$ being derived from resorcinol.

Exemplary arylate ester units are aromatic polyester units such as isophthalate-terephthalate-resorcinol ester units, isophthalate-terephthalate-bisphenol ester units, or a combination comprising each of these. Specific arylate ester units include poly(isophthalate-terephthalate-resorcinol) esters, poly(isophthalate-terephthalate-bisphenol-A) esters, poly[(isophthalate-terephthalate-resorcinol) ester-co-(isophthalate-terephthalate-bisphenol-A)]ester, or a combination comprising at least one of these. In an embodiment, a arylate ester unit is a poly(isophthalate-terephthalate-resorcinol)ester. In an embodiment, the arylate ester unit comprises isophthalate-terephthalate-resorcinol ester units in an amount greater than or equal to 95 mol %, specifically, greater than or equal to 99 mol %, and still more specifically, greater than or equal to 99.5 mol % based on the total number of moles of ester units in the polyarylate unit. In another embodiment, the arylate ester units are not substituted with non-aromatic hydrocarbon-containing substituents such as, for example, alkyl, alkoxy, or alkylene substituents.

The polyester can comprise a copolymer comprising alkylene terephthalate repeating ester units with another ester group. Specifically, ester units can include different alkylene terephthalate units, which can be present in the polymer chain as individual units, or as units of poly (alkylene terephthalates). For example, a polyester copolymer can comprise poly(1,4-cyclohexanedimethylene terephthalate)-co-poly(ethylene terephthalate), abbreviated as PETG where the polymer comprises greater than or equal to 50 mole % of poly(ethylene terephthalate), and abbreviated as PCTG where the polymer comprises greater than 50 mole % of poly(1,4-cyclohexanedimethylene terephthalate).

The polyester can comprise a poly(alkylene cyclohexanedicarboxylate). Of these, a specific example is poly (1,4-cyclohexane-dimethanol-1,4-cyclohexanedicarboxylate) (PCCD), having recurring units of formula (34):

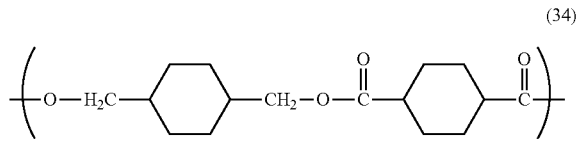

(34)

wherein, as described using formula (8), D is a dimethylene cyclohexane group derived from cyclohexane dimethanol, and T is a cyclohexane ring derived from cyclohexanedicarboxylate or a chemical equivalent thereof and is selected from the cis-isomer, trans-isomer, or a combination of cis- and trans-isomers.

The polymer composition can comprise a polysiloxane. The polysiloxane (also referred to herein as "polydiorganosiloxane") has repeat units of formula (11)

(11)

wherein each occurrence of R is same or different, and is a $C_{1-13}$ monovalent organic group. For example, each R can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination thereof. Combinations of the foregoing R groups can be used in the same copolymer. In an embodiment, the polysiloxane comprises R groups can have a minimum hydrocarbon content. An R group with a minimum hydrocarbon content can be a methyl group.

The value of E in formula (11) can vary widely depending on the type and relative amount of each component in the polymer composition, the desired properties of the composition, and like considerations. Herein, E can have an average value of 2 to 1,000, specifically, 10 to 100, more specifically, 25 to 75, more specifically, 40 to 50. E can have an average value of 4 to 60, specifically, 16 to 50, specifically, 20 to 45, and more specifically, 25 to 45. E can have an average value of 4 to 15, specifically, 5 to 15, more specifically, 6 to 15, and still more specifically, 7 to 12.

Polydiorganosiloxane units can be derived from dihydroxy aromatic compound of formula (12):

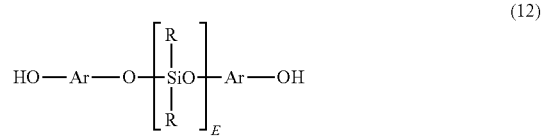

(12)

wherein E is as defined above; each R can independently be the same or different, and is as defined above; and each Ar can independently be the same or different, and is a substituted or unsubstituted $C_{6-30}$ arylene group, wherein the bonds are directly connected to an aromatic moiety. Exemplary Ar groups in formula (12) can be derived from a $C_{6-30}$ dihydroxy aromatic compound, for example, a dihydroxy aromatic compound of formula (3), (4), (8), or (9) above. Combinations comprising at least one of the foregoing dihydroxy aromatic compounds can also be used. Exemplary dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl)methane, 1,1-bis(4-hydroxyphenyl)ethane, 2,2-bis(4-hydroxyphenyl)propane, 2,2-bis(4-hydroxyphenyl) butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis (4-hydroxyphenyl)cyclohexane, bis(4-hydroxyphenyl sulfide), and 1,1-bis(4-hydroxy-t-butylphenyl)propane. Combinations comprising at least one of the foregoing dihydroxy compounds can also be used. The dihydroxy aromatic compound can be unsubstituted, or not substituted with non-aromatic hydrocarbon-containing substituents such as, for example, alkyl, alkoxy, or alkylene substituents.

When Ar is derived from resorcinol, the polydiorganosiloxane repeating units can be derived from dihydroxy aromatic compounds of formula (13):

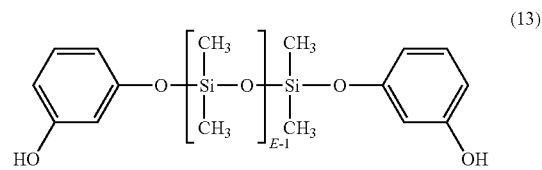

(13)

or, when Ar is derived from bisphenol-A, the polydiorganosiloxane repeating units can be derived from dihydroxy aromatic compounds of formula (14):

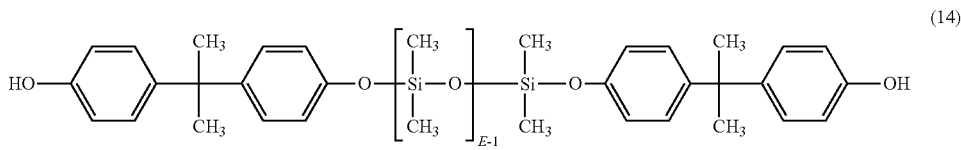

wherein E is as defined above.

Polydiorganosiloxane units can be derived from dihydroxy aromatic compound of formula (15):

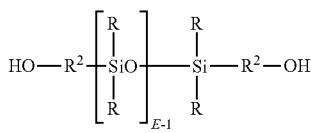

wherein R and E are as described above, and each occurrence of $R^2$ is independently a divalent $C_{1-30}$ alkylene or $C_{7-30}$ arylene-alkylene, and wherein the polymerized polysiloxane unit is the reaction residue of its corresponding dihydroxy aromatic compound. When $R^2$ is $C_{7-30}$ arylene-alkylene, the polydiorganosiloxane units can be derived from dihydroxy aromatic compound of formula (16):

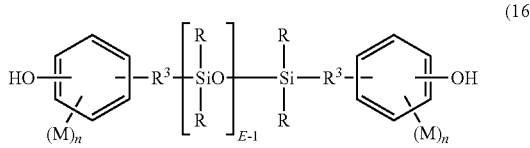

wherein R (such as aryl (such as phenyl, chlorophenyl or tolyl) or $C_{1-8}$ alkyl (such as methyl, haloalkyl (such as trifluoropropyl), or cyanoalkyl) and E are as defined above. Each $R^3$ is independently a divalent $C_{2-8}$ aliphatic group (such as dimethylene, trimethylene or tetramethylene). Each M can be the same or different, and can be a halogen (such as bromo or chloro), cyano, nitro, $C_{1-8}$ alkylthio, $C_{1-8}$ alkyl (such as methyl, ethyl, or propyl), $C_{1-8}$ alkoxy (such as methoxy, ethoxy, or propoxy), $C_{2-8}$ alkenyl, $C_{2-8}$ alkenyloxy group, $C_{3-8}$ cycloalkyl, $C_{3-8}$ cycloalkoxy, $C_{6-10}$ aryl (such as phenyl, chlorophenyl, or tolyl), $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4. For example, M can be methoxy, n can be one, $R^2$ can be a divalent $C_1$-$C_3$ aliphatic group, and R can be methyl.

M can be bromo or chloro, an alkyl group such as methyl, ethyl, or propyl, an alkoxy group such as methoxy, ethoxy, or propoxy, or an aryl group such as phenyl, chlorophenyl, or tolyl; $R^3$ can be a dimethylene, trimethylene or tetramethylene group; and R can be a $C_{1-8}$ alkyl, haloalkyl such as trifluoropropyl, cyanoalkyl, or aryl such as phenyl, chlorophenyl or tolyl. R can be methyl, or a combination of methyl and trifluoropropyl, or a combination of methyl and phenyl. M can be methoxy, n can be 0 or 1, $R^3$ can be a divalent $C_{1-3}$ aliphatic group, and R can be methyl.

The polydiorganosiloxane units can be derived from a dihydroxy aromatic compound of formula (17):

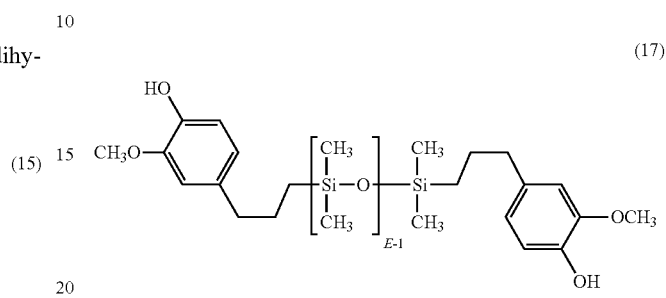

wherein E is as described above.

The polydiorganosiloxane units can be derived from dihydroxy aromatic compound of formula (18):

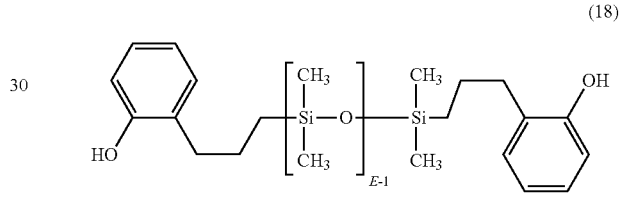

wherein E is as defined above.

Dihydroxy polysiloxanes typically can be made by functionalizing a substituted siloxane oligomer of formula (19):

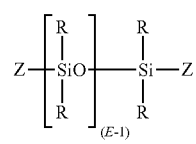

wherein R and E are as previously defined, and Z is H, halogen (e.g., Cl, Br, I), or carboxylate. Exemplary carboxylates include acetate, formate, benzoate, and the like. In an exemplary embodiment, where Z is H, compounds of formula (19) can be prepared by platinum catalyzed addition with an aliphatically unsaturated monohydric phenol. Exemplary aliphatically unsaturated monohydric phenols include, for example, eugenol, 2-allylphenol, 4-allylphenol, 4-allyl-2-methylphenol, 4-allyl-2-phenylphenol, 4-allyl-2-bromophenol, 4-allyl-2-t-butoxyphenol, 4-phenyl-2-allylphenol, 2-methyl-4-propenylphenol, 2-allyl-4,6-dimethylphenol, 2-allyl-4-bromo-6-methylphenol, 2-allyl-6-methoxy-4-methylphenol, and 2-allyl-4,6-dimethylphenol. Combinations comprising at least one of the foregoing can also be used. Where Z is halogen or carboxylate, functionalization can be accomplished by reaction with a dihydroxy aromatic compound of formulas (3), (4), (8), (9), or a combination comprising at least one of the foregoing dihydroxy aromatic compounds. Compounds of formula (12) can be formed from an alpha, omega-bisacetoxypolydiorangonosiloxane and a dihydroxy aromatic compound under phase transfer conditions.

The polymer composition can comprise one or more copolymers. Examples of copolymers include polycarbonate-polyesters, polycarbonate-polysiloxanes, polyester-polysiloxanes, and polycarbonate-polyester-polysiloxanes.

A polyester-polycarbonate copolymer can have a molar ratio of ester units to carbonate units of 1:99 to 99:1, specifically, 10:90 to 90:10, more specifically, 25:75 to 75:25. The polyester-polycarbonate can have the structure shown in formula (114):

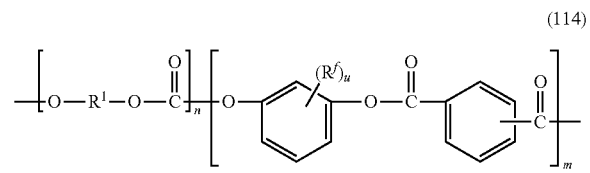

(114)

wherein $R^f$, u, m, n, and $R^1$ are defined above. The molar ratio of the isophthalate-terephthalate ester units to the carbonate units in the polyester-polycarbonate can be 1:99 to 99:1, specifically, 5:95 to 90:10, more specifically, 10:90 to 80:20. $R^1$ can comprise a resorcinol repeat unit. $R^1$ can comprise a diaryl carbonate repeat unit. If $R^1$ comprises both a resorcinol repeat unit and a diaryl carbonate repeat unit, they can be present in a molar ratio of resorcinol carbonate units to bisphenol carbonate units of 1:99 to 100:0. The MW of the arylate block can be controlled by adjusting the molar excess resorcinol to diacid chlorides, molar ratio of caustic to diacid chlorides during the diacid chloride addition and salt concentration during the oligomerization step as known in the art (for example US Pat. Appl. 2006 0160961 A1). The arylate-containing unit(s) in the polyester-polycarbonate unit can have an $M_w$ of 2,000 to 100,000 g/mol, specifically, 3,000 to 75,000 g/mol, more specifically, 4,000 to 50,000 g/mol, more specifically, 5,000 to 18,000 g/mol, and still more specifically, 9,000 to 14,000 g/mol. Molecular weight determinations are performed using GPC using a crosslinked styrene-divinyl benzene column, at a sample concentration of 1 milligram per milliliter, and as calibrated with polycarbonate standards. Samples are eluted at a flow rate of about 1.0 ml/min with methylene chloride as the eluent.

The polycarbonate-polysiloxane copolymer can be a polycarbonate that is end group functionalized with polysiloxane repeat units. The polysiloxane end groups can have less than or equal to 15 siloxane units. The polycarbonate-polysiloxane copolymer can comprise 1 to 60 mol %, specifically, 3 to 50 mol % of polydiorganosiloxane blocks relative to the moles of polycarbonate blocks. The polysiloxane copolymer can comprise ester repeat units (such as isophthalate-terephthalate-resorcinol ester repeat units), carbonate units (such as bisphenol A repeat units), or a combination comprising one or both of the foregoing. The polysiloxane copolymer can comprise an arylate containing unit, for example, in a polyester and/or in a polycarbonate repeat unit. The arylate-containing polysiloxane copolymer can comprise of 50 to 99 mol % of arylate ester units, specifically, 58 to 90 mol % arylate ester units; 0 to 50 mol % aromatic carbonate units (e.g., resorcinol carbonate units, bisphenol carbonate units, and other carbonate units such as aliphatic carbonate units) based on the total moles of repeat units in the polysiloxane copolymer. Specifically, the arylate-containing polysiloxane copolymer can comprise 0 to 30 mol % resorcinol carbonate units, specifically, 5 to 20 mol % resorcinol carbonate units; and 0 to 35 mol % bisphenol carbonate units, specifically, 5 to 35 mol % bisphenol carbonate units based on the total moles of repeat units in the polysiloxane copolymer.

The polycarbonate-polyester-polysiloxane includes those with polycarbonate units of formula (1) wherein $R^1$ is a $C_{6-30}$ arylene group, polysiloxane units derived from siloxane diols of formula (14), (17) or (18), and polyester units wherein T is a $C_{6-30}$ arylene group. T can be derived from isophthalic and/or terephthalic acid, or reactive chemical equivalents thereof. $R^1$ can be derived from the carbonate reaction product of a resorcinol of formula (9), or a combination of a resorcinol of formula (9) and a bisphenol of formula (4).

The polycarbonate-polyester-polysiloxane copolymer can comprise siloxane units in an amount of 0.1 to 25 weight percent (wt %), specifically, 0.2 to 10 wt %, more specifically, 0.2 to 6 wt %, even more specifically, 0.2 to 5 wt %, and still more specifically, 0.25 to 2 wt %, based on the total weight of the polycarbonate-polyester-polysiloxane copolymer, with the proviso that the siloxane units are provided by polysiloxane units covalently bonded in the polymer backbone of the polycarbonate-polyester-polysiloxane terpolymer. The polycarbonate-polyester-polysiloxane copolymer can comprise 0.1 to 49.85 wt % carbonate units, 50 to 99.7 wt % ester units, and 0.2 to 6 wt % polysiloxane units, based on the total weight of the polysiloxane units, ester units, and carbonate units. Alternatively, the polycarbonate-polyester-polysiloxane copolymer can comprise 0.25 to 2 wt % polysiloxane units, 60 to 96.75 wt % ester units, and 3.25 to 39.75 wt % carbonate units, based on the total weight of the polysiloxane units, ester units, and carbonate units.

The polycarbonate-polyester-polysiloxane copolymer can comprise repeat units that are randomly distributed throughout the copolymer. Alternatively, it may be desirable to distribute the polysiloxane units in the polycarbonate units, and thereby exclude the formation of polysiloxane-ester linkages. Alternatively, it may be desirable to distribute the polysiloxane units predominately in the polyester units. In an embodiment, oligomerization to form the polyester unit is completed in the presence of the end-group functionalized polysiloxane at which time significant amount of the siloxane is incorporated into the polyarylate block. After the addition of the second dihydroxy aromatic compound, the remaining unreacted end-group functionalized polysiloxane is incorporated into the carbonante block by addition of a carbonyl source. In a second embodiment, oligomerization to form the polyester unit is completed in the absence of the end-group functionalized polysiloxane, and the end group functionalized polysiloxane is charged to the reaction concomitantly with a dihydroxy aromatic compound, followed by addition of a carbonyl source. In an embodiment, the end-group functionalized polysiloxane is a hydroxy end-capped polysiloxane. In another embodiment, the hydroxy end-capped polysiloxane is added prior to the dihydroxy aromatic compound, and is reacted with a portion of the charge of the carbonyl source. Some of the hydroxy end-capped polysiloxanes (e.g., those derived from eugenol) as discussed herein, can have lower reactivity than dihydroxy aromatic compounds such as resorcinol and/or bisphenols, and hence may provide a distribution of polysiloxane which is more enriched in the polymer segments formed late in the reaction. In another embodiment, the dihydroxy aromatic compound and carbonyl source are added in portions to the polymerization after addition of the hydroxy end-capped polysiloxane. In an embodiment, where the end group functionalized polysiloxane has less than or equal to 15 siloxane units, a polysiloxane copolymer composition prepared according to this method has low haze.

In another embodiment, wherein it is desirable to distribute the polysiloxane units randomly with carbonate units in the polycarbonate unit, the dihydroxy aromatic compound and/or hydroxy end-capped polysiloxane is converted to its corresponding bis-chloroformate prior to condensation to form the carbonate linking groups of the polycarbonate. In this process, the polyarylate oligomer is initially prepared in a biphasic medium using a phase transfer catalyst, without an amine or condensation catalyst present. In an embodiment, the polyarylate oligomer is prepared using a resorcinol, where the resorcinol comprises the oligomer end groups. The polyarylate oligomer and excess resorcinol can be phosgenated at a pH of 2 to 11. In an embodiment, the polyarylate oligomer is phosgenated at pH of 4 to 10, specifically, 5 to 8 to provide chloroformate end groups, and are subsequently reacted with the hydroxy end-capped polysiloxane at a pH of about 8.5 to about 11, for a sufficient time, e.g., less than or equal to 20 min. A further charge of dihydroxy aromatic compound, such as a resorcinol and/or bisphenol, and additional charge of carbonyl source (e.g., phosgene) can be made. Molecular weight of the polymer can be increased in the reaction by addition of a condensation catalyst such as, for example, a tertiary amine. Optionally, additional phosgene can be added to ensure that substantially all of the phenolic end groups are incorporated. In another embodiment, oligomerization to prepare the hydroxy end-capped polyarylate is performed using a phase transfer catalyst, and the hydroxy end-capped polysiloxane is added. In an exemplary embodiment, a phase transfer catalyst has the formula $(R)_4Q^+X^-$, wherein R, Q, and X are as defined above. The combination is phosgenated to convert the phenolic hydroxy end groups to chloroformate groups, at a pH or 2 to 11, specifically, at a pH of 4 to 10, and more specifically, at a pH of 4 to 7. A second dihydroxy aromatic compound, such as a resorcinol and/or bisphenol, is added to the combination of chloroformates and condensed at a pH of 7.7 to 11.5, specifically, at a pH of 8 to 9, and the chloroformates and dihydroxy aromatic compound are reacted with additional phosgene and tertiary amine. Additional phosgene can be added if required to complete the polymerization.

Optionally, a second dihydroxy aromatic compound can be added to the polyarylate oligomer containing the hydroxy end-capped siloxane, excess resorcinol and tertiary amine catalyst followed by phosgenation at a pH of 2 to 11. In an embodiment, the mixture is phosgenated at pH of 6 to 8 for the first half of the required phosgene, followed by a pH of 8.5 to 10.5 for the second half of the phosgenation.

The siloxane-polyester-polycarbonate copolymer can have an $M_w$ of 15,000 to 100,000 g/mol, specifically, 16,000 to 75,000 g/mol, more specifically, 17,000 to 50,000 g/mol, more specifically, 17,000 to 45,000 g/mol, and still more specifically, 18,000 to 30,000 g/mol. Molecular weight determinations are performed using GPC using a crosslinked styrene-divinyl benzene column, at a sample concentration of 1 milligram per milliliter, and as calibrated with polycarbonate standards. Samples are eluted at a flow rate of about 1.0 ml/min with methylene chloride as the eluent.

The polymer composition can comprise two or more of a polysiloxane, a polyester, a polycarbonate, and a copolymer comprising one or more of the foregoing. The polymer composition can comprise a polysiloxane-polycarbonate copolymer and a polycarbonate and the polysiloxane-polycarbonate copolymer can be present in an amount of 5 to 50 parts by weight, more specifically, 10 to 40 parts by weight, based on 100 parts by weight of the polycarbonate and any impact modifier.

For example, the polymer composition can comprise a polysiloxane copolymer composition and polyester in a weight ratio of 1:99 to 99:1, specifically, 10:90 to 90:10, and more specifically, 30:70 to 70:30, based on the total weight of polysiloxane copolymer composition and polyester.

The polymer composition can comprise a polysiloxane-polycarbonate copolymer and a brominated polycarbonate. For example, the polymer composition can comprise greater than or equal to 5 wt %, specifically, 5 to 80 wt % of a poly(siloxane-co-carbonate); greater than or equal to 20 wt %, specifically, 20 to 95 wt % of a brominated polycarbonate (for example, a brominated polycarbonate derived from 2,2',6,6'-tetrabromo-4,4'-isopropylidenediphenol (2,2-bis(3,5-dibromo-4-hydroxyphenyl)propane (TBBPA) and carbonate units derived from at least one dihydroxy aromatic compound that is not TBBPA ("TBBPA copolymer")); and optionally a polycarbonate that is different from the poly(siloxane-co-carbonate) and the TBBPA copolymer. The third polycarbonate can be present in an amount of 8 to 12 wt % based on the total weight of the poly(siloxane-co-carbonate), TBBPA copolymer, and optional third polycarbonate.

The polymer composition can comprise a polysiloxane-polycarbonate copolymer and a brominated oligomer. The polymer composition can comprise greater than or equal to 5 wt %, specifically, 5 to 80 wt % of a poly(siloxane-co-carbonate); greater than or equal to 20 wt %, specifically, 20 to 95 wt % of a brominated oligomer; and optionally a polycarbonate that is different from the poly(siloxane-co-carbonate) and the brominated oligomer. The polymer composition can comprise greater than or equal to 0.3 wt % of siloxane and greater than or equal to 7.8 wt % of bromine based on the total weight of the poly(siloxane-co-carbonate), the brominated oligomer, and optional third polycarbonate. The third polycarbonate can be present in an amount of 8 to 12 wt % based on the total weight of the poly(siloxane-co-carbonate), the brominated oligomer, and optional third polycarbonate. The brominated oligomer can have a weight average molecular weight of 1000 to 10,000.

The polymer composition comprising a polysiloxane-polycarbonate copolymer and a brominated oligomer or a brominated polycarbonate can comprise greater than or equal to 0.3 wt % of siloxane and greater than or equal to 7.8 wt % of bromine based on the total weight polymer composition.

In some embodiments, the polymer layer can be 2 to 15 mm, specifically, 6 to 13 mm, more specifically, 8 to 13 mm. The polymer layer can be 2 to 15 mm, specifically, 2 to 12 mm, more specifically, 5 to 8 mm.

The polymer layer can comprise FRPC3 and can have a thickness of 2 to 15 mm, specifically, 6 to 15 mm, more specifically, 8 to 13 mm or less than or equal to 12 mm, specifically, 2 to 12 mm, more specifically, 5 to 8 mm. The polymer layer can comprise NonFRPC and can have a thickness of 2 to 15 mm, specifically, 6 to 13 mm, more specifically, 8 to 13 mm. The polymer layer can comprise FRPC1 and can have a thickness of 2 to 15 mm, specifically, 3 to 13 mm. The polymer layer can comprise FRPC2 and can have a thickness of 2 to 15 mm, specifically, 3 to 13 mm. The polymer layer can comprise FRPC4 and can have a thickness of 2 to 15 mm, specifically, 3 to 13 mm. The polymer layer can comprise FST1 and can have a thickness of 2 to 15 mm, specifically, 3 to 13 mm and can be laminated to a glass layer thickness of greater than 0.7 mm, specifically, greater than or equal to 0.8 mm. The polymer layer can comprise FST2 and can have a thickness of 2 to 15 mm, specifically, 3 to 13 mm. The polymer layer can comprise FST3 and can have a thickness of 2 to 15 mm, specifically, 3 to 13 mm. The polymer layer can comprise a flame retardant. Flame retardants include organic compounds that include phosphorus, bromine, and/or chlorine. Non-brominated and non-chlorinated phosphorus-containing flame retardants can be preferred in certain applications for regulatory reasons, for example, organic phosphates and organic compounds containing phosphorus-nitrogen bonds.

One type of organic phosphate is an aromatic phosphate of the formula $(GO)_3P=O$, wherein each G is independently an alkyl, cycloalkyl, aryl, alkylaryl, or aralkyl group, provided that at least one G is an aromatic group. Two of the G groups can be joined together to provide a cyclic group, for example, diphenyl pentaerythritol diphosphate. Aromatic phosphates include, phenyl bis(dodecyl)phosphate, phenyl bis(neopentyl)phosphate, phenyl bis(3,5,5'-trimethylhexyl) phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are illustrated in the formulas below:

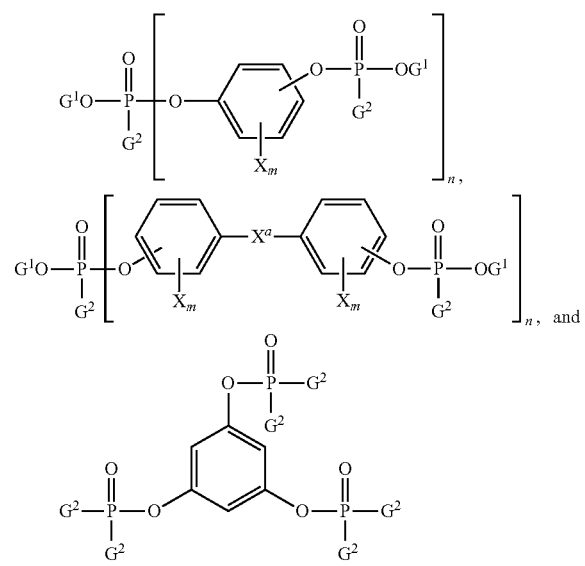

wherein each $G^1$ is independently a hydrocarbon having 1 to 30 carbon atoms; each $G^2$ is independently a hydrocarbon or hydrocarbonoxy having 1 to 30 carbon atoms; each X is independently a bromine or chlorine; m is 0 to 4, and n is 1 to 30. Di- or polyfunctional aromatic phosphorus-containing compounds of this type include resorcinol tetraphenyl diphosphate (RDP), the bis(diphenyl)phosphate of hydroquinone and the bis(diphenyl)phosphate of bisphenol A, respectively, their oligomeric and polymeric counterparts, and the like.

Flame retardant compounds containing phosphorus-nitrogen bonds include phosphonitrilic chloride, phosphorus ester amides, phosphoric acid amides, phosphonic acid amides, phosphinic acid amides, and tris(aziridinyl)phosphine oxide. Specific examples include phosphoramides of the formula:

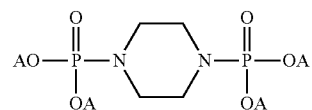

wherein each A moiety is a 2,6-dimethylphenyl moiety or a 2,4,6-trimethylphenyl moiety. These phosphoramides are piperazine-type phosphoramides.

Other flame retardant compounds containing phosphorus-nitrogen bonds include phosphazenes. Specific examples include phosphazenes of the formula:

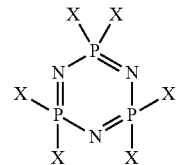

where X is —O-Phenyl, alkyl-phenyl, dialkylphenyl or trialkyl phenyl. An illustrative example of the phosphazenes would include SPB-100 from Otsuka Chemical Co., Ltd (X=phenyl).

When used, phosphorus-containing flame retardants can be present in amounts of 0.1 to 30 parts by weight, specifically, 1 to 20 parts by weight, based on 100 parts by weight of the total composition, excluding any filler.

Halogenated materials can also be used as flame retardants, for example, halogenated compounds and polymers of formula (20):

(20)

wherein R is an alkylene, alkylidene, or cycloaliphatic linkage (e.g., methylene, ethylene, propylene, isopropylene, isopropylidene, butylene, isobutylene, amylene, cyclohexylene, cyclopentylidene, and the like), a linkage selected from oxygen ether, carbonyl, amine, a sulfur containing linkage (e.g., sulfide, sulfoxide, or sulfone), a phosphorus containing linkage, and the like, or R can also consist of two or more alkylene or alkylidene linkages connected by such groups as aromatic, amino, ether, carbonyl, sulfide, sulfoxide, sulfone, a phosphorus containing linkage, and the like; Ar and Ar' can be the same or different and are mono- or polycarbocyclic aromatic groups such as phenylene, biphenylene, terphenylene, naphthylene, and the like; Y is an organic, inorganic or organometallic radical such as halogen (e.g., chlorine, bromine, iodine, or fluorine), ether group of the general formula OE wherein E is a monovalent hydrocarbon radical similar to X, monovalent hydrocarbon groups of the type represented by R, or other substituents (e.g., nitro, cyano, or the like), the substituents being essentially inert provided there be at least one and preferably two halogen atoms per aryl nucleus; each X is the same or different, and is a monovalent hydrocarbon group such as alkyl (e.g., methyl, ethyl, propyl, isopropyl, butyl, decyl, and the like), aryl (e.g., phenyl, naphthyl, biphenyl, xylyl, tolyl, and the like), arylalkylene (e.g., as benzyl, ethylenephenyl, and the like), cycloaliphatic (e.g., cyclopentyl, cyclohexyl, and the like), as well as monovalent hydrocarbon groups containing inert substituents therein; the letter d represents a whole number from 1 to a maximum equivalent to the number of replaceable hydrogens substituted on the aromatic rings comprising Ar or Ar'; the letter e represents a whole number from 0 to a maximum equivalent to the number of replaceable hydrogens on R; the letters a, b, and c represent whole numbers including 0, provided that when b is not 0, neither a nor c can be 0, or that either a or c, but not both, can be 0, or that where b is 0, the aromatic groups are joined by a direct carbon-carbon bond; the hydroxyl and Y substituents on the aromatic groups, Ar and Ar' can be varied in the ortho, meta or para positions on the aromatic rings and the groups can be in any possible geometric relationship with respect to one another.

Included within the scope of the above formula are: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant. When present, the halogen containing flame retardant can be present in an amount of 1 to 25 parts by weight, specifically, 2 to 20 parts by weight, based on 100 parts by weight of the total composition, excluding any filler.

The polymer composition can be essentially free of chlorine and bromine. Essentially free of chlorine and bromine refers to materials produced without the intentional addition of chlorine or bromine or chlorine or bromine containing materials. It is understood however that in facilities that process multiple products a certain amount of cross contamination can occur resulting in bromine and/or chlorine levels typically on the parts per million by weight scale. With this understanding, it can be readily appreciated that essentially free of bromine and chlorine can be defined as having a bromine and/or chlorine content of less than or equal to 100 parts per million by weight (ppm), less than or equal to 75 ppm, or less than or equal to 50 ppm. When this definition is applied to the fire retardant, it is based on the total weight of the fire retardant. When this definition is applied to the polymer composition it is based on the total weight of the composition, excluding any filler.

Inorganic flame retardants can also be used, for example, salts of $C_{2-16}$ alkyl sulfonates such as potassium perfluorobutane sulfonate (Rimar salt), potassium perfluorooctane sulfonate, and tetraethylammonium perfluorohexane sulfonate, salts of aromatic sulfonates such as sodium benzene sulfonate, sodium toluene sulfonate (NATS), and the like, salts of aromatic sulfone sulfonates such as potassium diphenylsulfone sulfonate (KSS), and the like; salts formed by reacting for example, an alkali metal or alkaline earth metal (e.g., lithium, sodium, potassium, magnesium, calcium and barium salts) and an inorganic acid complex salt, for example, an oxo-anion (e.g., alkali metal and alkaline-earth metal salts of carbonic acid, such as $Na_2CO_3$, $K_2CO_3$, $MgCO_3$, $CaCO_3$, and $BaCO_3$, or a fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Rimar salt and KSS and NATS, alone or in combination with other flame retardants, are particularly useful. When present, inorganic flame retardant salts are generally present in amounts of 0.01 to 10 parts by weight, more specifically, 0.02 to 1 parts by weight, based on 100 parts by weight of polycarbonate and impact modifier. Rimar salt and KSS and NATS, alone or in combination with other flame retardants, are particularly useful. The perfluoroalkyl sulfonate salt can be present in an amount of 0.30 to 1.00 wt %, specifically, 0.40 to 0.80 wt %, more specifically, 0.45 to 0.70 wt %, based on the total weight of the composition. The aromatic sulfonate salt can be present in the final polymer composition in an amount of 0.01 to 0.1 wt %, specifically, 0.02 to 0.06 wt %, and more specifically, 0.03 to 0.05 wt %. Exemplary amounts of aromatic sulfone sulfonate salt can be 0.01 to 0.6 wt %, specifically, 0.1 to 0.4 wt %, and more specifically, 0.25 to 0.35 wt %, based on the total weight of the polymer composition.

Combinations comprising at least one of the foregoing salts can be used, for example, a perfluoroalkyl sulfonate salt and an aromatic phosphate ester, or a combination of an aromatic phosphate ester and a polycarbonate-polysiloxane copolymer. Metal synergists, e.g., antimony oxide, can also be used with the flame retardant.

Anti-drip agents can also be used in the composition, for example, a fibril forming or non-fibril forming fluoropolymer such as polytetrafluoroethylene (PTFE). The anti-drip agent can be encapsulated by a rigid copolymer as described above, for example, styrene-acrylonitrile copolymer (SAN). PTFE encapsulated in SAN is known as TSAN. Encapsulated fluoropolymers can be made by polymerizing the encapsulating polymer in the presence of the fluoropolymer, for example, an aqueous dispersion. TSAN can provide significant advantages over PTFE, in that TSAN can be more readily dispersed in the composition. A TSAN can comprise 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Alternatively, the fluoropolymer can be pre-blended in some manner with a second polymer, such as, an aromatic polycarbonate or SAN to form an agglomerated material for use as an anti-drip agent. Either method can be used to produce an encapsulated fluoropolymer. An antidrip agent can be present in an amount of 0.1 to 10 percent by weight, based on 100 percent by weight of polycarbonate and impact modifier.

Exemplary multilayer articles can be prepared by adding an interlayer to a polymer layer; adding a glass layer to the interlayer to form a multilayer structure; and laminating the multilayer structure to form the multilayer article. For example, a multilayer article can be prepared by creating a laminate stack by placing a first interlayer on top of a first glass layer, then placing a polymer layer onto the first interlayer, then placing a second interlayer onto the polymer layer, and finally placing a second glass layer onto the second interlayer. A laminate stack of the multilayer article can be prepared similarly by placing a first interlayer on top of a first glass layer, then placing a polymer layer onto the first interlayer. The laminate stack used to create the multilayer article must then go through a lamination process where heat, pressure, and vacuum are applied to the material stack. During this process the interlayer material must soften to a point where it forms a bond between the glass and polymer layers of the material stack. The lamination process can be performed by a variety of processes known in the art and may include autoclave lamination, vacuum bag lamination, vacuum lamination, and/or parallel platen lamination.

In an embodiment, a multilayer article was prepared by placing the laminate stack in a vacuum bag and then placing the vacuum bagged laminate stack into an autoclave. From room temperature of 60° to 75° F., and specifically 66° F., the temperature in the autoclave was increased until the temperature in the laminate stack reached 115° to 135° F., specifically 125° F. at a rate of 1 to 5 degrees Fahrenheit per minute (° F./min), specifically 3.1° F./min. The laminate stack temperature was allowed to stabilize at this temperature for 3 to 10 minutes, specifically 5 minutes. After this stabilization step, the pressure and the temperature in the autoclave were increased. Pressure in the autoclave was gradually increased and then held at 100 to 125, specifically 115 pounds per square inch (psi) over 20 to 50, specifically 35 minutes. The temperature of the laminate stack was gradually increased to 260 to 290° F., and specifically to 275° F., over 30 minutes to 1 hour and 30 minutes, and specifically 52 minutes. The temperature was held at 260 to 290° F., and specifically to 275° F., for 10 to 60 minutes, specifically 15 minutes. The laminate stack was allowed to cool gradually at −1 to −5° F./min, specifically −2.24° F./min, to 100° to 130° F., specifically 120° F. where the pressure in the autoclave was released. The autoclave was opened and the laminate stack was allowed to return to room temperature.

In another embodiment, a multilayer article was prepared by placing the laminate stack in a vacuum laminator. From room temperature of 30° C. a vacuum was pulled in the vacuum laminator so that the pressure read 0 mBar. This condition was held for 15 minutes. The temperature was increased from 30 to 90° C. at 1° C./min while a pressure of 1 Bar was added to the vacuum pressure. The laminate stack was held at 90° C., 0 bar vacuum and 1 bar pressure for 4 hours. The temperature was increased from 90° C. to 115° C. at 1° C./min while maintaining the vacuum and pressure. The laminate stack was held at 115° C., 0 bar vacuum, and 1 bar pressure for 5 hours and 30 minutes. The vacuum and the pressure were then released and the sample was allowed to return to room temperature before removing it from the vacuum laminator. In this example, the polymer layer was dried in an oven for 12 hours at the glass transition temperature of the polymer, specifically 250° F. for polycarbonate.

The following examples are provided to illustrate the flame retardant properties of the multilayer article. The examples are merely illustrative and are not intended to limit devices made in accordance with the disclosure to the materials, conditions, or process parameters set forth therein.

EXAMPLES

The materials listed in Table 1 were used in the below examples.

TABLE 1

| Material | Details | Supplier |
| --- | --- | --- |
| Glass | Hardened Gorilla Glass | Corning |
| TPU | Thermoplastic polyurethane | Huntsman |
| HALS free EVA | Poly(ethylene-co-vinyl acetate) without hindered amine light stabilizers | STR |
| NonFRPC | Non flame retardant, UV stabilized bisphenol-A polycarbonate | SABIC's Innovative Plastics business |
| FRPC1 | 5-7 wt % Brominated Flame retardant bisphenol-A polycarbonate | SABIC's Innovative Plastics business |
| FRPC2 | 2-4 wt % Brominated Flame retardant bisphenol-A polycarbonate | SABIC's Innovative Plastics business |
| FRPC3 | Non-brominated flame retardant bisphenol-A polycarbonate | SABIC's Innovative Plastics business |
| FRPC4 | Mineral filled flame retardant impact modified bisphenol-A polycarbonate | SABIC's Innovative Plastics business |
| FST1 | A 50/50 blend of a polysiloxane-ITR (Isophthalic acid-terephthalic acid-resorcinol) - bisphenol-A copolyestercarbonate copolymer; with an ester content 83 mol %, siloxane content 1 wt % (average siloxane chain length about 10), interfacial polymerization, Mw = 22,500 to 26,500 g/mol, para-cumyl phenol end-capped, an ITR (Isophthalic acid-terephthalic acid-resorcinol) - bisphenol-A copolyestercarbonate copolymer; with an ester content 83 mol %, Mw = 22,500 to 26,500 g/mol, para-cumyl phenol end-capped and a phosphite heat stabilizer | SABIC's Innovative Plastics business |
| FST2 | A blend of a polysiloxane-ITR (Isophthalic acid-terephthalic acid-resorcinol) - bisphenol-A copolyestercarbonate copolymer; with an ester content 83 mol %, siloxane content 1 wt % (average siloxane chain length about 10), Mw ~21,000 g/mol, para-cumyl phenol end-capped, ~8 wt % BPADP and a phosphite heat stabilizer | SABIC's Innovative Plastics business |
| FST3 | A 50/40/10 blend of a polydimethylsiloxane - bisphenol A polycarbonate copolymer, produced via interfacial polymerization, 6 wt % siloxane, average PDMS block length of ~45 units (D45), Mw ~23,000 g/mol, para-cumylphenol (PCP) end-capped/A tetrabromo-bisphenol A (TBBPA) and bisphenol A (BPA) copolycarbonate | SABIC's Innovative Plastics business |

TABLE 1-continued

| Material | Details | Supplier |
|---|---|---|
| | (~30 mol % TBBPA) with an average Mw of ~22,500 g/mol, p-cumyl phenol (PCP) endcap/BPA polycarbonate, Mw of ~22,500 g/mol, p-cumyl phenol and a phosphite heat stabilizer | |

Examples 1-6: FAR Testing of Dual Sided Multilayer Articles

Dual sided multilayer articles with hardened glass layer, TPU or HALS free EVA interlayers, and polycarbonate polymer layers were prepared and tested for compliance with Federal Aviation Regulations as shown in Table 2.

Heat release testing was performed on 15.2×15.2 centimeter (cm) plaques 1.5 mm thick using the Ohio State University (OSU) 65/65 rate-of-heat release apparatus, in accordance with the method shown in FAR 25.853 (d), and in Appendix F, section IV (FAR F25.4). Total heat release was measured up to the two-minute mark in kW-min/m$^2$. Peak heat release was measured as kW/m$^2$. The heat release test method is also described in the "Aircraft Materials Fire Test Handbook" DOT/FAA/AR-00/12, Chapter 5 "Heat Release Test for Cabin Materials." In order to obtain a "pass," the two-minute total heat release had to be less than or equal to 65 kW-min/m$^2$ and the peak heat release rate had to be less than or equal to 65 kW/m$^2$.

Flame Spread per the method shown in ASTM E-162 was performed on 15.24 cm×45.72 cm samples with thicknesses ranging from 5 mm to 17 mm. In order to obtain a "pass", the Flame Spread Index had to be less than or equal to 100. Smoke density and toxicity testing per the methods shown in ASTM E-162, ASTM E-662-83, Bombardier SMP 800-C, ASTM F-814-83, Airbus ABD0031, and Boeing BSS 7239 was performed on 7.5×7.5 cm plaques with thicknesses ranging from 5 mm to 17 mm. Smoke density was measured under flaming mode at 4.0 min. In order to obtain a "pass," the smoke density had to be less than or equal to 200 at 4 minutes. In order to obtain a "pass" for the toxicity tests, the toxic gas generated from material combustion could not exceed the specified maxima as indicated here with for the associated toxic gasses: 3500 for Carbon Monoxide, 90000 for Carbon Dioxide, 100 for Nitrogen Oxides, 100 for Sulfur Dioxide, 500 for Hydrogen Chloride, 100 for Hydrogen Fluoride, 100 for Hydrogen Bromide, 100 for Hydrogen Cyanide. Smoke Generation according to the method shown in FAR 25.853 (d), Amendment No. 25-83, and in Appendix F, section V (DOT/FAA/AR-00/12)(FAR F25.5) was performed on 7.62 cm×30.48 cm samples with thicknesses ranging from 5 mm to 17 mm. In order to obtain a "pass," the smoke generation had to be less than or equal to 200.

TABLE 2

| | 1 | 2 | 3 | 4 | 5 | 6 |
|---|---|---|---|---|---|---|
| Interlayer material | TPU | TPU | EVA | EVA | EVA | EVA |
| Lexan grade | NonFRPC | NonFRPC | NonFRPC | NonFRPC | FRPC3 | FRPC3 |
| First glass layer (mm) | 0.7 | 0.7 | 0.7 | 0.7 | 0.7 | 0.7 |
| First TPU layer (mm) | 0.38 | 1.27 | 0.46 | 0.46 | 0.46 | 0.46 |
| Polymer layer (mm) | 3.18 | 12.7 | 6.35 | 12.7 | 6.35 | 12.7 |
| Second TPU layer (mm) | 0.38 | 1.27 | 0.46 | 0.46 | 0.46 | 0.46 |
| Second glass layer (mm) | 0.7 | 0.7 | 0.7 | 0.7 | 0.7 | 0.7 |
| Flame spread: ASTM E162 | Pass | Pass | Pass | Pass | Pass | Pass |
| Smoke density: ASTM E662 | Pass | Pass | Pass- | Pass | Pass | Pass |
| Smoke generation: FAR 25.853 (d) Appendix F Part V | Pass | Pass | Pass | Pass | Pass | Pass |
| Toxicity: SMP 800C and Boeing BSS 7239 | Pass | Pass | Pass | Pass | Pass | Pass |

Table 2 shows that the multilayer articles with glass layer thicknesses, TPU interlayers or HALS free EVA interlayers, and a NonFRPC or FRPC3 polymer layer were able to pass the Federal Aviation Regulations for flame spread, smoke density, smoke generation, and toxicity.

Examples 7-14: Ballistic Testing of Single and Dual Sided Multilayer Articles Single sided multilayer articles (Examples 7-8) and dual sided multilayer articles (Example 9-11) were prepared and tested for compliance with Ballistic and Block tests according to the Federal Railway Regulations and are shown in Table 3.

TABLE 3

|  | 7 | 8 | 9 | 10 | 11 | 12 | 13 | 14 |
|---|---|---|---|---|---|---|---|---|
| Interlayer material | TPU | EVA | TPU | EVA | TPU | — | — | TPU |
| First glass layer (mm) | 0.7 | 0.55 | 0.7 | 0.55 | 0.7 | — | — | 0.7 |
| First interlayer (mm) | 0.38 | 0.46 | 0.38 | 0.46 | 0.38 | — | — | 0.38 |
| NonFRPC polymer layer (mm) | 6.35 | 6.35 | 9.53 | 9.53 | 12.7 | 9.53 | 12.7 | 6.35 |
| Second interlayer (mm) | — | — | 0.38 | 0.46 | 0.38 | — | — | 0.38 |
| Second glass layer (mm) | — | — | 0.7 | 0.55 | 0.7 | — | — | 0.7 |
| Ballistic Threat FRA CFR 49 Type I | Pass | Fail | Pass | Fail | Pass | Fail | Pass | Fail |
| Block Threat FRA CFR 49 Type I | Pass | Pass | Pass | Pass | Pass | Pass | Pass | Pass |

Table 3 shows that for a single sided multilayer article, the glass layer should be greater than or equal to 0.7 mm and the polymer layer should be greater than or equal to 6 mm in order to pass the Ballistic and Block tests. Table 3 shows that for a dual sided multilayer article, the glass layer should be greater than or equal to 0.7 mm and the polymer layer should be greater than or equal to 9 mm in order to pass the Ballistic and Block tests. Table 3 shows that the polymer layer without any glass laminate should be greater than or equal to 12 mm in order to pass the Ballistic and Block tests.

Examples 15-25: Testing of Dual Sided Multilayer Articles for Compliance with the European Flammability Test Dual sided multilayer articles with hardened glass layer, TPU or HALS free EVA interlayers, and polycarbonate polymer and copolymer layers were prepared and tested for compliance with European flammability regulations as shown in Table 4.

Heat release testing was performed on 10×10 centimeter (cm) plaques ranging in thickness from 4.5 to 17 mm, in accordance with the method shown in EN45545 and ISO 5660. Maximum average heat release (MARHE) was measured in kiloWatts per square meter ($kW/m^2$)] In order to obtain an HL2 level "pass," the heat release had to be less than 90 $kW/m^2$.

Fire propagation testing was performed on 80×15.5 centimeter (cm) plaques ranging in thickness from 4.5 to 17 mm thick, in accordance with the method shown in EN45545 and ISO 5658-2. In order to obtain a "pass," the critical flux at extinguishment (CFE) had to be greater than 20 $kW/m^2$.

Smoke density and toxicity testing was performed on 7.5×7.5 cm plaques ranging in thickness from 4.5 to 17 mm according to the method shown in EN 45545 and ISO 5659-2 for a smoke density at 240 seconds, where in order to obtain a "pass," the smoke density had to be less than 300, and $VOF_4$, where in order to obtain a "pass," the smoke density had to be less than 600, and $CIT_G$, where in order to obtain a "pass," the toxicity had to be less than 0.9 for an HL2 rating and 1.2 for an HL1 rating.

TABLE 4

|  | 15 | 16 | 17 | 18 | 19 | 20 | 21 | 22 | 23 | 24 | 25 | 26 |
|---|---|---|---|---|---|---|---|---|---|---|---|---|
| polymer/Lexan grade | NonFRPC | NonFRPC | NonFRPC | NonFRPC | FRPC1 | FRPC3 | FRPC3 | FST2 | FST1 | FST3 | FRPC2 | FRPC2 |
| Interlayer material | TPU | EVA | TPU | EVA | EVA | EVA | EVA | EVA | EVA | EVA | EVA | EVA |
| First glass layer (mm) | 0.7 | 0.7 | 0.7 | 0.7 | 0.7 | 0.7 | 0.7 | 0.7 | 0.7 | 0.7 | 0.7 | 0.7 |
| First interlayer (mm) | 0.38 | 0.46 | 0.38 | 0.46 | 0.46 | 0.46 | 0.46 | 0.46 | 0.46 | 0.46 | 0.46 | 0.46 |
| polymer layer (mm) | 6.35 | 6.35 | 12.7 | 12.7 | 3.18 | 12.7 | 5 | 3 | 3 | 3 | 3 | 8 |
| Second interlayer (mm) | 0.38 | 0.46 | 0.38 | 0.46 | 0.46 | 0.46 | 0.46 | 0.46 | 0.46 | 0.46 | 0.46 | 0.46 |
| Second glass layer (mm) | 0.7 | 0.7 | 0.7 | 0.7 | 0.7 | 0.7 | 0.7 | 0.7 | 0.7 | 0.7 | 0.7 | 0.7 |
| Heat release EN45545 (ISO 5660) | Fail | Fail | Fail | Pass | Pass | Fail | Fail | Pass | Pass | Pass | Pass | Pass |
| Fire Propagation EN45545 (ISO 5658-2) | Pass | Fail | Pass | Pass | Pass | Pass | Pass | Pass | Pass | Pass | Pass | Pass |
| Smoke Density EN45545 (ISO 5659-2) DS 240 s | Pass | Pass | Pass | Pass | Pass | Pass | Pass | Pass | Pass | Pass | Pass | Pass |
| Smoke Density EN45545 (ISO 5659-2) $VOF_4$ | Pass | Pass | Pass | Pass | Pass | Pass | Pass | Pass | Pass | Pass | Pass | Pass |
| Toxicity EN45545 (ISO 5659-2) $CIT_G$ | Not tested | Not tested | Not tested | Pass HL2 | Pass HL1 | Not tested | Not tested | Pass HL2 | Pass HL2 | Pass HL3 | Pass HL2 | Pass HL2 |

Table 4 above shows that Examples 18, 19, 22-26 were surprisingly able to pass all the European flammability tests. Table 4 also shows that neither of Examples 15 and 17 with a TPU interlayer were able to pass the heat release test, even at thinner interlayer thicknesses. Table 4 also shows that materials with not enough flame retardant do not pass as shown in examples 16, 20, and 21. Table 4 also shows that materials with high levels of bromine for flame retardant result in a lower class rating for toxicity as seen in example 19.

Examples 27-37: Testing of Dual Sided Multilayer Articles for Compliance with the British Flammability Test Dual sided multilayer articles 27-37 with hardened glass layer, HALS free EVA interlayers, and polycarbonate polymer and copolymer layers were prepared and tested for compliance with British flammability regulations as shown in Table 5.

Flame spread testing was performed in accordance with the method shown in BS476, Part 7. In order to obtain a "pass," the flame spread had to be less than or equal to 165 mm. Fire propagation testing was performed in accordance with the method shown in BS476, Part 6. In order to obtain a "pass," the fire propagation had to be less than or equal to 12. Smoke generation testing was performed in accordance with the method shown in BS 6853:1999 Annex D8.4 Panel Smoke test. In order to obtain a "pass," the tested article must have an Ao (On) of less than 2.6 and an Ao (off) of less than 3.9. Toxicity testing was performed in accordance with the method shown in BS 6853:1999 Annex B.2. In order to obtain a "pass," the toxicity had to be less than or equal to 1.

multilayer articles with hardened glass layers, interlayers that perfectly bond the glass layers to the polymer layers, and polycarbonate polymer layers were simulated and tested for deflection as shown in Tables 6 and 7. Examples 38-40 and 44-45 are dual sided double pane examples similar to FIG. 11, where pane 4 comprising the first polymer layer is the outside pane and pane 104 comprising the second polymer layer is the inside pane. Examples 41-43 and 46-47 are single sided double pane examples similar to FIG. 10, where pane 2 comprising the first polymer layer is the outside pane and pane 102 comprising the second polymer layer is the inside pane.

Table 6 shows a deflection test for intercity trains where a 1,467 mm by 1,215 mm test sample with an applied load of 2,500 Newtons per meter squared ($N/m^2$) to the inside pane was considered to pass as it had a maximum deflection of less than or equal to 5 mm.

TABLE 6

| | 38 | 39 | 40 | 41 | 42 | 43 |
|---|---|---|---|---|---|---|
| First glass layer (mm) | 0.7 | 0.7 | 0.7 | 0.7 | 0.7 | 0.7 |
| First polymer layer (mm) | 12 | 9.5 | 6 | 12 | 12.7 | 3.18 |
| Second glass layer (mm) | 0.7 | 0.7 | 0.7 | — | — | — |
| Air gap (mm) | 12 | 12 | 12 | 12 | 12 | 12 |
| Third glass layer (mm) | 0.7 | 0.7 | 0.7 | — | — | — |
| Second polymer layer (mm) | 6 | 6 | 6 | 6 | 6 | 6 |
| Fourth glass layer (mm) | 0.7 | 0.7 | 0.7 | 0.7 | 0.7 | 0.7 |
| Outside pane max deformation (mm) | Pass | Pass | Fail | Fail | Fail | Fail |
| Outside pane max stress (MPa) | Pass | Pass | Fail | Fail | Fail | Fail |
| Inside pane max deformation (mm) | Fail | Fail | Fail | Fail | Fail | Fail |
| Inside pane max stress (MPa) | Fail | Fail | Fail | Fail | Fail | Fail |

TABLE 5

| | 27 | 28 | 29 | 30 | 31 | 32 | 33 | 34 | 35 | 36 | 37 |
|---|---|---|---|---|---|---|---|---|---|---|---|
| Lexan grade | FRPC3 | FRPC3 | FRPC3 | FRPC4 | FRPC3 | FRPC1 | FRPC1 | FST1 | FST1 | FST2 | FST3 |
| First glass layer (mm) | 0.7 | 1 | 0.7 | 0.7 | 1 | 0.7 | 1 | 0.7 | 1 | 0.7 | 1 |
| First interlayer (mm) | 0.46 | 0.46 | 0.46 | 0.46 | 0.46 | 0.46 | 0.46 | 0.46 | 0.46 | 0.46 | 0.46 |
| Polymer layer (mm) | 6.35 | 6.35 | 12.7 | 2 | 12.7 | 3.18 | 3.18 | 3.18 | 3.18 | 3.18 | 3.18 |
| Second interlayer (mm) | 0.46 | 0.46 | 0.46 | 0.46 | 0.46 | 0.46 | 0.46 | 0.46 | 0.46 | 0.46 | 0.46 |
| Second glass layer (mm) | 0.7 | 1 | 0.7 | 0.7 | 1 | 0.7 | 1 | 0.7 | 1 | 0.7 | 1 |
| Flame spread BS476 Part 7 | no test | no test | no test | Fail | Fail | no test | no test | Pass | Pass | Pass | Pass |
| Fire Propagation B5476 Part 6 | Fail | Fail | Fail | Pass | Fail | Fail | Fail | Fail | Pass | Pass | Pass |
| Smoke BS6853 Annex D8.4 | no test | no test | no test | no test | no test | no test | no test | no test | Pass | Pass | Pass |
| Toxicity BS6853 Annex B.2 | no test | no test | no test | no test | no test | no test | no test | no test | Pass | Pass | Pass |

Table 5 shows that Examples 35, 36 and 37 are surprisingly able to pass the flame spread, the fire propagation, the smoke, and the toxicity tests. Comparing Examples 34 and 35, Example 35 has an increased glass layer of 1 mm and was able to pass the tests, where Example 34 had a glass layer of only 0.7 mm and was not able to pass the fire propagation test. Example 36, with a polymer layer of FST2 and a glass layer thickness of 0.7 mm was able to pass all tests.

Examples 38-43: Deflection Testing of Dual Sided Multilayer Articles for Compliance with the Rail Standards Simulations were performed using finite element analysis. In the simulations, double paned, single and dual sided Table 6 shows that the outside pane of Example 38 and 39 were able to pass the maximum deflection test. It is noted, that while the remaining panes did not pass the maximum deflection test, modifying the pane, for example, by decreasing the area of the pane and/or by increasing the layer thickness of one or both of the polymer layer and/or a glass layer would likely result in a pass.

Table 7 shows a deflection test for high speed trains where a 1,512 mm by 842 mm test sample with an applied load of 6,000 $N/m^2$ to the inside pane was considered to pass as it had a maximum deflection of less than or equal to 5 mm.

TABLE 7

|  | 44 | 45 | 46 | 47 |
|---|---|---|---|---|
| First glass layer (mm) | 0.7 | 0.7 | 0.7 | 0.7 |
| First polymer layer (mm) | 12.7 | 10 | 12.7 | 10 |
| Second glass layer (mm) | 0.7 | 0.7 | — | — |
| Air gap (mm) | 12 | 12 | 12 | 12 |
| Third glass layer (mm) | 0.7 | 0.7 | — | — |
| Second polymer layer (mm) | 6 | 6 | 6 | 6 |
| Fourth glass layer (mm) | 0.7 | 0.7 | 0.7 | 0.7 |
| Outside pane max deformation (mm) | Pass | Pass | Pass | Fail |
| Outside pane max stress (MPa) | Pass | Pass | Pass | Fail |
| Inside pane max deformation (mm) | Pass | Pass | Fail | Fail |
| Inside pane max stress (MPa) | Pass | Pass | Fail | Fail |

Table 7 shows that the outside and inside panes of Example 44 and 45 and the outside pane of Example 46 were able to pass the maximum deflection test. It is noted, that while the remaining panes did not pass the maximum deflection test, modifying the pane, for example, by decreasing the area of the panes and/or increasing the layer thickness of one or both of the polymer layer and/or a glass layer would likely result in a pass.

Examples 48-56: Testing of Dual Sided Multilayer Articles for Compliance with Federal Aviation Regulations (FARs), in Particular the Heat Release Rate Standard Described in FAR 25.853(d) Appendix F, Part IV and Determined Using the Ohio State University Calorimeter Dual sided multilayer articles 48-56 with hardened glass layer, HALS free EVA interlayers, and polycarbonate polymer and copolymer layers were prepared and tested for compliance with FAR 25.853(d) Appendix F, Part IV and determined using the Ohio State University calorimeter. In order to have a "pass," the article must have a 2 minute (min) integrated heat release rate of less than or equal to 65 kilowatt-minutes per square meter (kW-min/m$^2$) and a peak heat release rate of less than 65 kilowatts per square meter (kW/m$^2$) determined using the Ohio State University calorimeter, abbreviated as OSU 65/65 (2 min/peak). In order to have a "pass," to the more stringent test, the article must have a 2 minute integrated heat release rate of less than or equal to 55 kW-min/m$^2$ and a peak heat release rate of less than 55 kW/m$^2$ (abbreviated as OSU 55/55).

TABLE 8

|  | 48 | 49 | 50 | 51 | 52 | 53 | 54 | 55 | 56 |
|---|---|---|---|---|---|---|---|---|---|
| polymer/Lexan grade | NonFRPC | NonFRPC | FRPC3 | FRPC3 | FRPC2 | FRPC2 | FST1 | FST2 | FST3 |
| Interlayer material | EVA | EVA | EVA | EVA | EVA | EVA | EVA | EVA | EVA |
| First glass layer (mm) | 0.7 | 0.7 | 0.7 | 0.7 | 0.7 | 0.7 | 0.7 | 0.7 | 0.7 |
| First interlayer (mm) | 0.46 | 0.46 | 0.46 | 0.46 | 0.46 | 0.46 | 0.46 | 0.46 | 0.46 |
| polymer layer (mm) | 3 | 12 | 3 | 12 | 3 | 8 | 3 | 3 | 3 |
| Second interlayer (mm) | 0.46 | 0.46 | 0.46 | 0.46 | 0.46 | 0.46 | 0.46 | 0.46 | 0.46 |
| Second glass layer (mm) | 0.7 | 0.7 | 0.7 | 0.7 | 0.7 | 0.7 | 0.7 | 0.7 | 0.7 |
| OSU 65/65 | Fail | Fail | Pass | Fail | Pass | Pass | Pass | Pass | Pass |
| OSU 55/55 | Fail | Fail | Fail | Fail | Fail | Fail | Pass | Pass | Pass |

Table 8 shows that examples of multilayer articles made with a polymer or copolymer that did not have a flame retardant in its composition as in examples 48 and 49 did not pass the OSU 65/65 or 55/55 tests. Adding some flame retardant to the polymer composition, as shown in example 50 or a brominated flame retardant as shown in examples 52 and 53 resulted in a pass to the 65/65 standard. The use of a copolymer as shown in examples 54, 55, and 56 resulted in a pass of both the 65/65 and the 55/55 tests.

Embodiments may alternately comprise, consist of, or consist essentially of, any appropriate components herein disclosed. Furthermore, embodiments, may additionally, or alternatively, be formulated so as to be devoid, or substantially free, of any components, materials, ingredients, adjuvants or species used in the prior art compositions or that are otherwise not necessary to the achievement of the function and/or objectives of the present disclosure.

All ranges disclosed herein are inclusive of the endpoints, and the endpoints are independently combinable with each other (e.g., ranges of "up to 25 wt %, or, more specifically, 5 to 20 wt %", is inclusive of the endpoints and all intermediate values of the ranges of "5 to 25 wt %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to Applicants or others skilled in the art. Accordingly, the appended claims as filed and as they may be amended are intended to embrace all such alternatives, modifications variations, improvements, and substantial equivalents.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. In addition, it is to be understood that the described elements may be combined in any suitable manner in the various embodiments.

With respect to the figures, it is noted that these figures are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the description for the sake of clarity, these terms are intended to refer only to the particular structure of the embodiments selected for illustration in the drawings, and are not intended to define or limit the scope of the disclosure. In the drawings and the description herein, it is to be understood that like numeric designations refer to components of like function.

Disclosure of a narrower range in addition to a broader range is not a disclaimer of the broader range.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While this description can include many specifics, these should not be construed as limitations on the scope thereof, but rather as descriptions of features that can be specific to particular embodiments. Certain features that have been heretofore described in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and can even be initially claimed as such, one or more features from a claimed combination can in some cases be excised from the combination, and the claimed combination can be directed to a subcombination or variation of a subcombination.

Similarly, while operations are depicted in the drawings or figures in a particular order, this should not be understood as requiring that such operations be performed in the particular order shown or in sequential order, or that all illustrated operations be performed, to achieve desirable results. In certain circumstances, multitasking and parallel processing can be advantageous.

As shown by the various configurations and embodiments illustrated in FIGS. 1-11, various embodiments for methods for light-weight, high stiffness glass laminate structures have been described.

While preferred embodiments of the present disclosure have been described, it is to be understood that the embodiments described are illustrative only and that the scope of the invention is to be defined solely by the appended claims when accorded a full range of equivalence, many variations and modifications naturally occurring to those of skill in the art from a perusal hereof

We claim:
1. A laminate structure comprising:
 a first glass layer;
 a second glass layer; and
 a polymer interlayer structure intermediate the first and second glass layers,
 wherein the polymer interlayer structure is comprised of
  a first polymeric layer adjacent to the first glass layer,
  a second polymeric layer adjacent to the second glass layer, and
  a polymeric core intermediate the first and second polymeric layers, the polymeric core comprising one or more of a polysiloxane, a polyester, a polycarbonate, a copolymer comprising one or more of the foregoing and combinations thereof, and
 wherein the first glass layer is comprised of a strengthened glass;
 wherein the thicknesses of the first and second glass layers are different;
 wherein the thickness of the first glass layer does not exceed 1.0 mm; and
 wherein the first glass layer has a surface compressive stress of between about 400 MPa and about 900 MPa with a depth of layer of compressive stress of about 30 microns or more.

2. The laminate structure of claim 1 wherein the strengthened glass of the first glass layer is chemically strengthened glass or thermally strengthened glass.

3. The laminate structure of claim 1 wherein the second glass layer is comprised of strengthened glass and wherein the strengthened glass of the second glass layer is chemically strengthened glass or thermally strengthened glass.

4. The laminate structure of claim 1 wherein one or more surfaces of the first and second glass layers are chemically etched.

5. The laminate structure of claim 1 wherein the thickness of the second glass layer is selected from the group consisting of a thickness not exceeding 1.5 mm, a thickness not exceeding 1.0 mm, a thickness not exceeding 0.7 mm, a thickness not exceeding 0.5 mm, a thickness within a range from about 0.1 mm to about 1.0 mm, a thickness from about 0.5 mm to about 1.0 mm, and a thickness from about 0.5 mm to about 0.7 mm.

6. The laminate structure of claim 1 wherein the thicknesses of the first and second polymeric layers are selected from the group consisting of a thickness ranging from about 0.1 mm to about 0.8 mm, a thickness from about 0.1 mm to about 0.5 mm, and a thickness from about 0.1 mm to about 0.3 mm.

7. The laminate structure of claim 1 wherein the thickness of the core is selected from the group consisting of a thickness ranging from about 2.0 mm to about 10.0 mm, a thickness from about 2.0 mm to about 8.0 mm, a thickness from 2.0 mm to about 5.0 mm, and a thickness from about 2.0 mm to about 3.8 mm.

8. The laminate structure of claim 1 wherein the composition of the first and second glass layers are different or the composition of the first and second polymeric layers are different or both.

9. The laminate structure of claim 1 wherein the second glass layer has a surface compressive stress of between about 400 MPa and about 900 MPa and a depth of layer of compressive stress of about 30 microns or more.

10. The laminate structure of claim 1 wherein the thickness of the core is a function of the thickness of the first glass layer, the thickness of the second glass layer, or both the thicknesses of the first and second glass layers.

11. The laminate structure of claim 1, wherein the core comprises a polysiloxane copolymer comprising:
 a.) a polysiloxane unit of the formula:

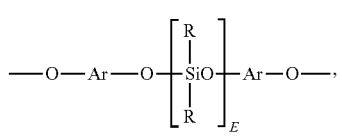

or of the formula:

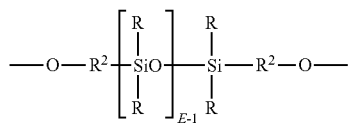

wherein E is 4 to 50; each R is the same or different and is a $C_{1-13}$ monovalent organic group, and each $R^2$ is independently a divalent $C_{1-30}$ alkylene or $C_{7-30}$ arylene-alkylene; and Ar is a $C_{6-30}$ arylene group; and b.) an arylate-containing unit consisting of 50 to 100 mole percent of arylate ester units, less than 50 mole percent aromatic carbonate units, less than 30 mole percent resorcinol carbonate units, and less than 35 mole percent bisphenol carbonate units, wherein the siloxane units of the polysiloxane unit are present in the polysiloxane copolymer composition in an amount of 0.2 to 10 wt % based on the weight of the polysiloxane copolymer composition.

12. The laminate structure of claim 1, wherein the core comprises a polysiloxane-polycarbonate copolymer derived from at least one dihydroxy aromatic containing polycarbonate unit, and at least one polysiloxane bisphenol of formula (1), formula (2), or a combination thereof

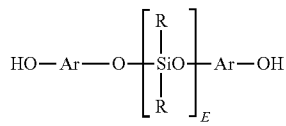  (1)

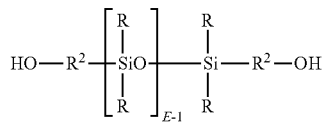  (2)

wherein R is each independently a $C_{1-30}$ hydrocarbon group, $R^2$ is each independently a $C_{7-30}$ hydrocarbon group, Ar is a $C_{6-30}$ aromatic group and, E has an average value of 5 to 200;

a second polycarbonate comprising brominated carbonate units derived from 2,2',6,6'-tetrabromo-4,4'-isopropylidenediphenol and carbonate units derived from at least one dihydroxy aromatic compound that is not 2,2',6,6'-tetrabromo-4,4'-isopropylidenediphenol; and optionally, a third polycarbonate different from the polysiloxane-polycarbonate copolymer and second polycarbonate;

wherein the wt % of the polysiloxane-polycarbonate copolymer, the second polycarbonate, and the optional third polycarbonate sum to 100 wt %; wherein the first polycarbonate is present in an amount effective to provide the siloxane units in an amount of at least 0.3 wt %, based on the sum of the wt % of the polysiloxane-polycarbonate copolymer, the second polycarbonate, and the optional third polycarbonate, and the second polycarbonate is present in an amount effective to provide the bromine of the second polycarbonate in an amount of at least 7.8 wt %, based on the sum of the wt % of the polysiloxane-polycarbonate copolymer, the second polycarbonate, and the optional third polycarbonate.

13. The laminate structure of claim 1, wherein the core comprises a first polymer comprising a polyetherimide-polysiloxane copolymer comprising (a) a repeating polyetherimide unit, and (b) a polysiloxane block unit, the polysiloxane block unit having the formula:

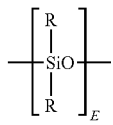

wherein R is each independently a $C_{1-30}$ hydrocarbon group, and E has an average value of 5 to 200;

a second polymer different from the first polymer and comprising bromine; and an optional one or more third polymers comprising a polycarbonate different from the first polymer and second polymer;

wherein the wt % of the first polymer, second polymer, and optional one or more third polymers sum to 100 wt %; and where the siloxane units are present in the composition in an amount of at least 0.3 wt %, based on the sum of the wt % of the first, second, and optional one or more third polymers, and the bromine is present in the composition in an amount of at least 7.8 wt %, based on the sum of the wt % of the first, second, and optional one or more third polymers.

* * * * *